United States Patent
Sinyavskiy et al.

(10) Patent No.: US 9,463,571 B2
(45) Date of Patent: Oct. 11, 2016

(54) APPARATUS AND METHODS FOR ONLINE TRAINING OF ROBOTS

(71) Applicant: BRAIN CORPORATION, San Diego, CA (US)

(72) Inventors: Oleg Sinyavskiy, San Diego, CA (US); Jean-Baptiste Passot, La Jolla, CA (US); Eugene Izhikevich, San Diego, CA (US)

(73) Assignee: Brian Corporation, San Diego, CA (US)

( * ) Notice: Subject to any disclaimer, the term of this patent is extended or adjusted under 35 U.S.C. 154(b) by 4 days.

(21) Appl. No.: 14/070,114

(22) Filed: Nov. 1, 2013

(65) Prior Publication Data

US 2015/0127149 A1    May 7, 2015

(51) Int. Cl.

| | |
|---|---|
| *B25J 9/16* | (2006.01) |
| *G06N 3/00* | (2006.01) |
| *G06N 3/04* | (2006.01) |
| *G05D 1/00* | (2006.01) |
| *G05D 1/02* | (2006.01) |
| *G06N 99/00* | (2010.01) |

(52) U.S. Cl.
CPC ............. *B25J 9/163* (2013.01); *G05D 1/0088* (2013.01); *G05D 1/0221* (2013.01); *G06N 3/008* (2013.01); *G06N 3/049* (2013.01); *G05B 2219/33056* (2013.01); *G05B 2219/40499* (2013.01); *G06N 99/005* (2013.01); *Y10S 901/03* (2013.01)

(58) Field of Classification Search
CPC .......... G05B 2219/40496; G05B 2219/40494; G05B 2219/40498; G05B 2219/40508
See application file for complete search history.

(56) References Cited

U.S. PATENT DOCUMENTS

| | | |
|---|---|---|
| 3,920,972 A | 11/1975 | Corwin, Jr. et al. |
| 4,468,617 A | 8/1984 | Ringwall |
| 4,617,502 A | 10/1986 | Sakaue et al. |

(Continued)

FOREIGN PATENT DOCUMENTS

| | | |
|---|---|---|
| CN | 102226740 | 10/2011 |
| EP | 2384863 A2 | 11/2011 |

(Continued)

OTHER PUBLICATIONS

PCT International Search Report and Written Opinion for PCT/US14/48512 dated Jan. 23, 2015, pp. 1-14.

(Continued)

*Primary Examiner* — Khoi Tran
*Assistant Examiner* — Ryan Rink
(74) *Attorney, Agent, or Firm* — Gazdinski & Associates, PC

(57) ABSTRACT

Robotic devices may be trained by a user guiding the robot along a target trajectory using a correction signal. A robotic device may comprise an adaptive controller configured to generate control commands based on one or more of the trainer input, sensory input, and/or performance measure. Training may comprise a plurality of trials. During an initial portion of a trial, the trainer may observe robot's operation and refrain from providing the training input to the robot. Upon observing a discrepancy between the target behavior and the actual behavior during the initial trial portion, the trainer may provide a teaching input (e.g., a correction signal) configured to affect robot's trajectory during subsequent trials. Upon completing a sufficient number of trials, the robot may be capable of navigating the trajectory in absence of the training input.

20 Claims, 12 Drawing Sheets

(56) References Cited

U.S. PATENT DOCUMENTS

| | | |
|---|---|---|
| 4,638,445 A | 1/1987 | Mattaboni |
| 4,706,204 A | 11/1987 | Hattori |
| 4,763,276 A | 8/1988 | Perreirra et al. |
| 4,852,018 A | 7/1989 | Grossberg |
| 5,063,603 A | 11/1991 | Burt |
| 5,092,343 A | 3/1992 | Spitzer |
| 5,121,497 A | 6/1992 | Kerr et al. |
| 5,245,672 A | 9/1993 | Wilson |
| 5,303,384 A | 4/1994 | Rodriguez et al. |
| 5,355,435 A | 10/1994 | DeYong |
| 5,388,186 A | 2/1995 | Bose |
| 5,408,588 A | 4/1995 | Ulug |
| 5,467,428 A | 11/1995 | Ulug |
| 5,579,440 A | 11/1996 | Brown |
| 5,602,761 A | 2/1997 | Spoerre et al. |
| 5,638,359 A | 6/1997 | Peltola |
| 5,673,367 A * | 9/1997 | Buckley .................. 706/23 |
| 5,687,294 A | 11/1997 | Jeong |
| 5,719,480 A | 2/1998 | Bock |
| 5,739,811 A | 4/1998 | Rosenberg et al. |
| 5,841,959 A | 11/1998 | Guiremand |
| 5,875,108 A | 2/1999 | Hoffberg |
| 5,994,864 A | 11/1999 | Inoue et al. |
| 6,009,418 A | 12/1999 | Cooper |
| 6,014,653 A | 1/2000 | Thaler |
| 6,169,981 B1 | 1/2001 | Werbos |
| 6,218,802 B1 | 4/2001 | Onoue et al. |
| 6,259,988 B1 | 7/2001 | Galkowski et al. |
| 6,272,479 B1 | 8/2001 | Farry et al. |
| 6,363,369 B1 | 3/2002 | Liaw |
| 6,366,293 B1 | 4/2002 | Hamilton |
| 6,442,451 B1 | 8/2002 | Lapham |
| 6,458,157 B1 | 10/2002 | Suaning |
| 6,489,741 B1 | 12/2002 | Genov |
| 6,493,686 B1 | 12/2002 | Francone et al. |
| 6,545,705 B1 | 4/2003 | Sigel |
| 6,545,708 B1 | 4/2003 | Tamayama et al. |
| 6,546,291 B2 | 4/2003 | Merfeld |
| 6,581,046 B1 | 6/2003 | Ahissar |
| 6,601,049 B1 | 7/2003 | Cooper |
| 6,636,781 B1 | 10/2003 | Shen |
| 6,643,627 B2 | 11/2003 | Liaw |
| 6,697,711 B2 | 2/2004 | Yokono |
| 6,703,550 B2 | 3/2004 | Chu |
| 6,760,645 B2 | 7/2004 | Kaplan et al. |
| 6,961,060 B1 | 11/2005 | Mochizuki et al. |
| 7,002,585 B1 | 2/2006 | Watanabe |
| 7,024,276 B2 | 4/2006 | Ito |
| 7,324,870 B2 | 1/2008 | Lee |
| 7,342,589 B2 | 3/2008 | Miserocchi |
| 7,395,251 B2 | 7/2008 | Linsker |
| 7,398,259 B2 | 7/2008 | Nugent |
| 7,426,501 B2 | 9/2008 | Nugent |
| 7,668,605 B2 | 2/2010 | Braun |
| 7,672,920 B2 | 3/2010 | Ito |
| 7,752,544 B2 | 7/2010 | Cheng |
| 7,849,030 B2 | 12/2010 | Ellingsworth |
| 8,015,130 B2 | 9/2011 | Matsugu |
| 8,145,355 B2 | 3/2012 | Danko |
| 8,214,062 B2 | 7/2012 | Eguchi et al. |
| 8,271,134 B2 | 9/2012 | Kato et al. |
| 8,315,305 B2 | 11/2012 | Petre |
| 8,380,652 B1 | 2/2013 | Francis, Jr. |
| 8,419,804 B2 | 4/2013 | Herr et al. |
| 8,452,448 B2 * | 5/2013 | Pack et al. .................. 700/246 |
| 8,467,623 B2 | 6/2013 | Izhikevich |
| 8,509,951 B2 | 8/2013 | Gienger |
| 8,571,706 B2 | 10/2013 | Zhang et al. |
| 8,639,644 B1 | 1/2014 | Hickman et al. |
| 8,655,815 B2 | 2/2014 | Palmer et al. |
| 8,751,042 B2 | 6/2014 | Lee |
| 8,793,205 B1 | 7/2014 | Fisher |
| 8,924,021 B2 | 12/2014 | Dariush et al. |
| 8,958,912 B2 | 2/2015 | Blumberg et al. |
| 8,972,315 B2 | 3/2015 | Szatmary et al. |
| 8,990,133 B1 | 3/2015 | Ponulak et al. |
| 9,008,840 B1 | 4/2015 | Ponulak et al. |
| 9,015,092 B2 | 4/2015 | Sinyavskiy et al. |
| 9,015,093 B1 | 4/2015 | Commons |
| 9,047,568 B1 | 6/2015 | Fisher et al. |
| 9,056,396 B1 | 6/2015 | Linnell |
| 9,070,039 B2 | 6/2015 | Richert |
| 9,082,079 B1 | 7/2015 | Coenen |
| 9,104,186 B2 | 8/2015 | Sinyavskiy et al. |
| 9,144,907 B2 | 9/2015 | Summer et al. |
| 9,186,793 B1 | 11/2015 | Meier |
| 9,189,730 B1 | 11/2015 | Coenen et al. |
| 9,193,075 B1 | 11/2015 | Cipollini et al. |
| 9,195,934 B1 | 11/2015 | Hunt et al. |
| 9,213,937 B2 | 12/2015 | Ponulak |
| 9,242,372 B2 | 1/2016 | Laurent et al. |
| 2001/0045809 A1 | 11/2001 | Mukai |
| 2002/0038294 A1 | 3/2002 | Matsugu |
| 2002/0103576 A1 | 8/2002 | Takamura et al. |
| 2002/0158599 A1 | 10/2002 | Fujita et al. |
| 2002/0169733 A1 | 11/2002 | Peters |
| 2002/0175894 A1 | 11/2002 | Grillo |
| 2002/0198854 A1 * | 12/2002 | Berenji et al. .................. 706/12 |
| 2003/0023347 A1 | 1/2003 | Konno |
| 2003/0050903 A1 | 3/2003 | Liaw |
| 2003/0108415 A1 | 6/2003 | Hosek et al. |
| 2003/0144764 A1 * | 7/2003 | Yokono et al. ............... 700/245 |
| 2003/0220714 A1 | 11/2003 | Nakamura et al. |
| 2004/0030449 A1 | 2/2004 | Solomon |
| 2004/0036437 A1 | 2/2004 | Ito |
| 2004/0051493 A1 | 3/2004 | Furuta |
| 2004/0128028 A1 | 7/2004 | Miyamoto et al. |
| 2004/0131998 A1 | 7/2004 | Marom et al. |
| 2004/0136439 A1 | 7/2004 | Dewberry |
| 2004/0158358 A1 | 8/2004 | Anezaki et al. |
| 2004/0162638 A1 | 8/2004 | Solomon |
| 2004/0167641 A1 | 8/2004 | Kawai et al. |
| 2004/0172168 A1 | 9/2004 | Watanabe et al. |
| 2004/0193670 A1 | 9/2004 | Langan |
| 2004/0267404 A1 | 12/2004 | Danko |
| 2005/0004710 A1 | 1/2005 | Shimomura |
| 2005/0008227 A1 | 1/2005 | Duan et al. |
| 2005/0015351 A1 | 1/2005 | Nugent |
| 2005/0036649 A1 | 2/2005 | Yokono |
| 2005/0049749 A1 | 3/2005 | Watanabe et al. |
| 2005/0065651 A1 | 3/2005 | Ayers |
| 2005/0069207 A1 | 3/2005 | Zakrzewski et al. |
| 2005/0113973 A1 | 5/2005 | Endo et al. |
| 2005/0119791 A1 | 6/2005 | Nagashima |
| 2005/0125099 A1 | 6/2005 | Mikami et al. |
| 2005/0283450 A1 | 12/2005 | Matsugu |
| 2006/0069448 A1 | 3/2006 | Yasui |
| 2006/0082340 A1 | 4/2006 | Watanabe et al. |
| 2006/0094001 A1 | 5/2006 | Torre |
| 2006/0129277 A1 | 6/2006 | Wu et al. |
| 2006/0129506 A1 | 6/2006 | Edelman et al. |
| 2006/0149489 A1 | 7/2006 | Joublin et al. |
| 2006/0161218 A1 | 7/2006 | Danilov |
| 2006/0161300 A1 | 7/2006 | Gonzalez-Banos et al. |
| 2006/0167530 A1 | 7/2006 | Flaherty et al. |
| 2006/0181236 A1 | 8/2006 | Brogardh et al. |
| 2006/0189900 A1 | 8/2006 | Flaherty et al. |
| 2006/0207419 A1 | 9/2006 | Okazaki et al. |
| 2006/0250101 A1 | 11/2006 | Khatib et al. |
| 2007/0022068 A1 | 1/2007 | Linsker |
| 2007/0074177 A1 | 3/2007 | Kurita et al. |
| 2007/0100780 A1 | 5/2007 | Fleischer et al. |
| 2007/0112700 A1 | 5/2007 | Den Haan et al. |
| 2007/0151389 A1 | 7/2007 | Prisco et al. |
| 2007/0176643 A1 | 8/2007 | Nugent |
| 2007/0200525 A1 | 8/2007 | Kanaoka |
| 2007/0208678 A1 | 9/2007 | Matsugu |
| 2007/0250464 A1 | 10/2007 | Hamilton |
| 2007/0255454 A1 | 11/2007 | Dariush et al. |
| 2007/0260356 A1 | 11/2007 | Kock |
| 2008/0024345 A1 | 1/2008 | Watson |
| 2008/0040040 A1 * | 2/2008 | Goto et al. .................. 701/301 |
| 2008/0097644 A1 | 4/2008 | Kaznov |
| 2008/0100482 A1 | 5/2008 | Lazar |

(56) References Cited

U.S. PATENT DOCUMENTS

| | | |
|---|---|---|
| 2008/0112596 A1 | 5/2008 | Rhoads et al. |
| 2008/0133052 A1 | 6/2008 | Jones |
| 2008/0140257 A1 | 6/2008 | Sato et al. |
| 2008/0154428 A1 | 6/2008 | Nagatsuka |
| 2008/0162391 A1 | 7/2008 | Izhikevich |
| 2008/0294074 A1 | 11/2008 | Tong et al. |
| 2008/0319929 A1 | 12/2008 | Kaplan et al. |
| 2009/0037033 A1 | 2/2009 | Phillips et al. |
| 2009/0043722 A1 | 2/2009 | Nugent |
| 2009/0069943 A1 | 3/2009 | Akashi et al. |
| 2009/0105786 A1 | 4/2009 | Fetz et al. |
| 2009/0231359 A1 | 9/2009 | Bass, II et al. |
| 2009/0234501 A1 | 9/2009 | Ishizaki |
| 2009/0272585 A1 | 11/2009 | Nagasaka |
| 2009/0287624 A1 | 11/2009 | Rouat |
| 2009/0299751 A1 | 12/2009 | Jung |
| 2009/0312817 A1 | 12/2009 | Hogle et al. |
| 2010/0036457 A1 | 2/2010 | Sarpeshkar |
| 2010/0081958 A1 | 4/2010 | She |
| 2010/0086171 A1 | 4/2010 | Lapstun |
| 2010/0152896 A1 | 6/2010 | Komatsu et al. |
| 2010/0152899 A1 | 6/2010 | Chang et al. |
| 2010/0166320 A1 | 7/2010 | Paquier |
| 2010/0169098 A1 | 7/2010 | Patch |
| 2010/0198765 A1 | 8/2010 | Fiorillo |
| 2010/0222924 A1 | 9/2010 | Gienger |
| 2010/0225824 A1 | 9/2010 | Lazar |
| 2010/0286824 A1 | 11/2010 | Solomon |
| 2010/0292835 A1 | 11/2010 | Sugiura et al. |
| 2010/0299101 A1 | 11/2010 | Shimada |
| 2010/0305758 A1 | 12/2010 | Nishi et al. |
| 2010/0312730 A1 | 12/2010 | Weng et al. |
| 2011/0010006 A1 | 1/2011 | Tani et al. |
| 2011/0016071 A1 | 1/2011 | Guillen |
| 2011/0026770 A1* | 2/2011 | Brookshire .................. 382/103 |
| 2011/0035052 A1 | 2/2011 | McLurkin |
| 2011/0035188 A1 | 2/2011 | Martinez-Heras et al. |
| 2011/0040405 A1 | 2/2011 | Lim et al. |
| 2011/0060460 A1 | 3/2011 | Oga et al. |
| 2011/0060461 A1 | 3/2011 | Velliste et al. |
| 2011/0067479 A1 | 3/2011 | Davis et al. |
| 2011/0071676 A1 | 3/2011 | Sanders et al. |
| 2011/0107270 A1 | 5/2011 | Wang et al. |
| 2011/0110006 A1 | 5/2011 | Meyer et al. |
| 2011/0119214 A1 | 5/2011 | Breitwisch |
| 2011/0119215 A1 | 5/2011 | Elmegreen |
| 2011/0144802 A1 | 6/2011 | Jang |
| 2011/0158476 A1 | 6/2011 | Fahn et al. |
| 2011/0160741 A1 | 6/2011 | Asano et al. |
| 2011/0160906 A1 | 6/2011 | Orita et al. |
| 2011/0160907 A1 | 6/2011 | Orita |
| 2011/0196199 A1 | 8/2011 | Donhowe |
| 2011/0208350 A1 | 8/2011 | Eliuk et al. |
| 2011/0218676 A1 | 9/2011 | Okazaki |
| 2011/0231016 A1 | 9/2011 | Goulding |
| 2011/0244919 A1 | 10/2011 | Aller et al. |
| 2011/0282169 A1 | 11/2011 | Grudic et al. |
| 2011/0296944 A1 | 12/2011 | Carter |
| 2011/0319714 A1 | 12/2011 | Roelle et al. |
| 2012/0008838 A1 | 1/2012 | Guyon et al. |
| 2012/0011090 A1 | 1/2012 | Tang |
| 2012/0011093 A1 | 1/2012 | Aparin et al. |
| 2012/0017232 A1 | 1/2012 | Hoffberg et al. |
| 2012/0036099 A1 | 2/2012 | Venkatraman et al. |
| 2012/0045068 A1 | 2/2012 | Kim et al. |
| 2012/0053728 A1 | 3/2012 | Theodorus |
| 2012/0109866 A1 | 5/2012 | Modha |
| 2012/0143495 A1 | 6/2012 | Dantu |
| 2012/0144242 A1 | 6/2012 | Vichare et al. |
| 2012/0150777 A1 | 6/2012 | Setoguchi et al. |
| 2012/0150781 A1 | 6/2012 | Arthur |
| 2012/0173021 A1 | 7/2012 | Tsusaka |
| 2012/0185092 A1 | 7/2012 | Ku |
| 2012/0197439 A1 | 8/2012 | Wang |
| 2012/0209428 A1 | 8/2012 | Mizutani |
| 2012/0209432 A1 | 8/2012 | Fleischer |
| 2012/0296471 A1 | 11/2012 | Inaba et al. |
| 2012/0303091 A1 | 11/2012 | Izhikevich |
| 2012/0303160 A1 | 11/2012 | Ziegler et al. |
| 2012/0308076 A1 | 12/2012 | Piekniewski |
| 2012/0308136 A1 | 12/2012 | Izhikevich |
| 2013/0000480 A1 | 1/2013 | Komatsu et al. |
| 2013/0006468 A1 | 1/2013 | Koehrsen et al. |
| 2013/0019325 A1 | 1/2013 | Deisseroth |
| 2013/0310979 A1 | 1/2013 | Herr et al. |
| 2013/0066463 A1 | 3/2013 | Choi et al. |
| 2013/0073080 A1 | 3/2013 | Ponulak |
| 2013/0073484 A1 | 3/2013 | Izhikevich |
| 2013/0073491 A1 | 3/2013 | Izhikevich et al. |
| 2013/0073492 A1 | 3/2013 | Izhikevich |
| 2013/0073493 A1 | 3/2013 | Modha |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0096719 A1 | 4/2013 | Sanders |
| 2013/0116827 A1 | 5/2013 | Inazumi |
| 2013/0151442 A1 | 6/2013 | Suh et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0172906 A1 | 7/2013 | Olson et al. |
| 2013/0173060 A1 | 7/2013 | Yoo et al. |
| 2013/0218821 A1 | 8/2013 | Szatmary |
| 2013/0245829 A1 | 9/2013 | Ohta et al. |
| 2013/0251278 A1 | 9/2013 | Izhikevich |
| 2013/0297541 A1 | 11/2013 | Piekniewski et al. |
| 2013/0297542 A1 | 11/2013 | Piekniewski |
| 2013/0325244 A1 | 12/2013 | Wang |
| 2013/0325766 A1 | 12/2013 | Petre et al. |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy et al. |
| 2013/0325775 A1 | 12/2013 | Sinyavskiy |
| 2013/0325776 A1 | 12/2013 | Ponulak |
| 2013/0325777 A1 | 12/2013 | Petre |
| 2013/0345718 A1 | 12/2013 | Crawford et al. |
| 2013/0346347 A1 | 12/2013 | Patterson et al. |
| 2014/0012788 A1 | 1/2014 | Piekniewski |
| 2014/0016858 A1 | 1/2014 | Richert |
| 2014/0025613 A1 | 1/2014 | Ponulak |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0081895 A1 | 3/2014 | Coenen |
| 2014/0089232 A1 | 3/2014 | Buibas |
| 2014/0114479 A1 | 4/2014 | Okazaki |
| 2014/0122397 A1 | 5/2014 | Richert et al. |
| 2014/0122398 A1 | 5/2014 | Richert |
| 2014/0156574 A1 | 6/2014 | Piekniewski et al. |
| 2014/0163729 A1 | 6/2014 | Shi et al. |
| 2014/0193066 A1 | 7/2014 | Richert |
| 2014/0222739 A1 | 8/2014 | Ponulak |
| 2014/0229411 A1 | 8/2014 | Richert et al. |
| 2014/0244557 A1 | 8/2014 | Piekniewski et al. |
| 2014/0277718 A1 | 9/2014 | Izhikevich |
| 2014/0277744 A1 | 9/2014 | Coenen |
| 2014/0309659 A1 | 10/2014 | Roh et al. |
| 2014/0358284 A1 | 12/2014 | Laurent et al. |
| 2014/0358828 A1 | 12/2014 | Phillipps et al. |
| 2014/0369558 A1 | 12/2014 | Holz |
| 2014/0371907 A1 | 12/2014 | Passot et al. |
| 2014/0371912 A1 | 12/2014 | Passot et al. |
| 2015/0032258 A1 | 1/2015 | Passot et al. |
| 2015/0094850 A1 | 4/2015 | Passot et al. |
| 2015/0094852 A1 | 4/2015 | Laurent et al. |
| 2015/0127149 A1 | 5/2015 | Sinyavskiy et al. |
| 2015/0127154 A1 | 5/2015 | Passot et al. |
| 2015/0127155 A1 | 5/2015 | Passot et al. |
| 2015/0148956 A1 | 5/2015 | Negishi |
| 2015/0204559 A1 | 7/2015 | Hoffberg et al. |
| 2015/0283701 A1 | 10/2015 | Izhikevich et al. |

(56) References Cited

U.S. PATENT DOCUMENTS

| | | |
|---|---|---|
| 2015/0283702 A1 | 10/2015 | Izhikevich et al. |
| 2015/0283703 A1 | 10/2015 | Izhikevich et al. |
| 2015/0306761 A1 | 10/2015 | O'Connor et al. |
| 2015/0317357 A1 | 11/2015 | Harmsen et al. |
| 2015/0338204 A1 | 11/2015 | Richert et al. |
| 2015/0339589 A1 | 11/2015 | Fisher |
| 2015/0339826 A1 | 11/2015 | Buibas et al. |
| 2015/0341633 A1 | 11/2015 | Richert |
| 2016/0004923 A1 | 1/2016 | Piekniewski et al. |
| 2016/0014426 A1 | 1/2016 | Richert |

FOREIGN PATENT DOCUMENTS

| | | |
|---|---|---|
| JP | 4087423 | 3/1992 |
| JP | 2003175480 | 6/2003 |
| RU | 2108612 C1 | 10/1998 |
| WO | 2008083335 | 7/2008 |
| WO | 2010136961 | 12/2010 |
| WO | WO-2011039542 A1 | 4/2011 |
| WO | WO-2012151585 A2 | 11/2012 |

OTHER PUBLICATIONS

Abbott et al. (2000), "Synaptic plasticity: taming the beast", Nature Neuroscience, 3, 1178-1183.
Bartlett et al., "Convexity, Classification, and Risk Bounds" Jun. 16, 2005, pp. 1-61.
Bartlett et al., "Large margin classifiers: convex loss, low noise, and convergence rates" Dec. 8, 2003, 8 pgs.
Bohte, "Spiking Nueral Networks" Doctorate at the University of Leiden, Holland, Mar. 5, 2003, pp. 1-133 [retrieved on Nov. 14, 2012]. Retrieved from the internet: <URL: http://homepages.cwi.nl/-sbohte/publication/phdthesis.pdf>.
Brette et al., Brain: a simple and flexible simulator for spiking neural networks, The Neuromorphic Engineer, Jul. 1, 2009, pp. 1-4, doi: 10.2417/1200906.1659.
Cessac et al. "Overview of facts and issues about neural coding by spikes." Journal of Physiology, Paris 104.1 (2010): 5.
Cuntz et al., "One Rule to Grow Them All: A General Theory of Neuronal Branching and Its Paractical Application" PLOS Computational Biology, 6 (8), Published Aug. 5, 2010.
Davison et al., PyNN: a common interface for neural network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Dorval et al. "Probability distributions of the logarithm of interspike intervals yield accurate entropy estimates from small datasets." Journal of neuroscience methods 173.1 (2008): 129.
Fidjeland et al. "Accelerated Simulation of Spiking Neural Networks Using GPUs" WCCI 2010 IEEE World Congress on Computational lntelligience, Jul. 18-23, 2010—CCIB, Barcelona, Spain, pp. 536-543, [retrieved on Nov. 14, 2012]. Retrieved from the Internet: <URL:http://www.doc.ic.ac.ukl-mpsha/IJCNN10b.pdf>.
Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.
Gewaltig et al., NEST (Neural Simulation Tool), Scholarpedia, 2007, pp. 1-15, 2( 4 ): 1430, doi: 1 0.4249/scholarpedia.1430.
Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.
Gollisch et al. "Rapid neural coding in the retina with relative spike latencies." Science 319.5866 (2008): 11 08-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.
Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.
Izhikevich, "Polychronization: Computation with Spikes", Neural Computation, 25, 2006, 18, 245-282.
Izhikevich et al., "Relating STDP to BCM", Neural Computation (2003) 15, 1511-1523.
Izhikevich, "Simple Model of Spiking Neurons", IEEE Transactions on Neural Networks, Vol. 14, No. 6, Nov. 2003, pp. 1569-1572.
Jin et al. (2010) "Implementing Spike-Timing-Dependent Plasticity on SpiNNaker Neuromorphic Hardware", WCCI 2010, IEEE World Congress on Computational Intelligence.
Karbowski et al., "Multispikes and Synchronization in a Large Neural Network with Temporal Delays", Neural Computation 12, 1573-1606 (2000)).
Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Laurent, "The Neural Network Query Language (NNQL) Reference" [retrieved on Nov. 12, 2013]. Retrieved from the Internet: <URL https://code.google.com/p/nnql/issues/detail?id=1>.
Laurent, "Issue 1—nnq1—Refactor Nucleus into its own file—Neural Network Query Language" [retrieved on Nov. 12, 2013]. Retrieved from the Internet: <URL:https:1/code.google.com/p/nnql/issues/detail?id=1 >.
Lazar et al. "A video time encoding machine", in Proceedings of the 15th IEEE International Conference on Image Processing (ICIP '08}, 2008, pp. 717-720.
Lazar et al. "Consistent recovery of sensory stimuli encoded with MIMO neural circuits." Computational intelligence and neuroscience (2010): 2.
Lazar et al. "Multichannel time encoding with integrate-and-fire neurons." Neurocomputing 65 (2005): 401-407.
Masquelier, Timothee. "Relative spike time coding and STOP-based orientation selectivity in the early visual system in natural continuous and saccadic vision: a computational model." Journal of computational neuroscience 32.3 (2012): 425-441.
Nguyen et al., "Estimating divergence functionals and the likelihood ratio by penalized convex risk minimization" 2007, pp. 1-8.
Nichols, A Reconfigurable Computing Architecture for Implementing Artificial Neural Networks on FPGA, Master's Thesis, The University of Guelph, 2003, pp. 1-235.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.
Sato et al., "Pulse interval and width modulation for video transmission." Cable Television, IEEE Transactions on 4 (1978): 165-173.
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.

(56) References Cited

OTHER PUBLICATIONS

Simulink® model [online], [Retrieved on Dec. 10, 2013] Retrieved from <URL: http://www.mathworks.com/products/simulink/index.html>.
Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8.
Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.1000879#>.
Wang "The time dimension for scene analysis." Neural Networks, IEEE Transactions on 16.6 (2005): 1401-1426.
Sjostrom et al., "Spike-Timing Dependent Plasticity" Scholarpedia, 5(2):1362 (2010), pp. 1-18.
Lazar et al. "Consistent recovery of sensory stimuli encoded with MIMO neural circuits." Computational intelligence and neuroscience (2009): 2.
Alvarez, 'Review of approximation techniques', PhD thesis, chapter 2. pp. 7-14, University of Bradford, 2000.
Makridakis et al., 'Evaluating Accuracy (or Error) Measures', INSEAD Technical Report, 1995/18/TM.
Walters, "Implementation of Self-Organizing Neural Networks for Visuo-Motor Control of an Industrial Robot", IEEE Transactions on Neural Networks, vol. 4, No. 1, Jan. 1993, pp. 86-95.
Froemke et al., "Temporal Modulation of Spike-Timing-Dependent Plasticity", Frontiers in Synaptic Neuroscience, vol. 2, article 19, Jun. 2010, pp. 1-16.
Grollman et al., 2007 "Dogged Learning for Robots" IEEE International Conference on Robotics and Automation (ICRA).
PCT International Search Report for PCT/US2014/040407 dated Oct. 17, 2014.
PCT International Search Report for International Application PCT/US2013/026738 dated Jul. 21, 2014.
Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <http://msc.berkely.edu/wjchen/publications/DSC12_8726_FI.pdf>.
Bouganis et al., Training a Spiking Neural Network to Control a 4-DoF Robotic Arm based on Spiking Timing-Dependent Plasticity in WCCI 2010 IEEE World Congress on Computational Intelligence Jul. 2010 [Retrieved on Jun. 24, 2014] Retrieved from internet: http://www.doc.ic.ac.uk/~mpsha/IJCNN10a.pdf>.
Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from internet: <http://ncs.ethz.ch/projects/evospike/publications/evolving-spiking-neural-networks for-spatio-and-spectro-temporal-pattern-recognition-plenary-talk-ieee-is>.
<a href="http://www.braincorporation.corn/specs/BStem_SpecSheet_Rev_Nov11_2013.pdf">http://www.braincorporation.corn/specs/BStem_SpecSheet_Rev_Nov11_2013.pdf</a>.
A Neural Network for Ego-motion Estimation from Optical Flow, by Branka, Published 1995.
Chung Hyuk Park., et al., Transfer of Skills between Human Operators through Haptic Training with Robot Coordination. International Conference on Robotics and Automation Anchorage Convention District, Anchorage, Alaska, USA, pp. 229-235 [online], 2010 [retrieved Dec. 3, 2015]. Retrieved from the Internet: <URL: https://smartech.gatech.edu!bitstream/handle/1853/38279/IEEE_2010_ICRA_002.pdf>.
Computation of Optical Flow Using a Neural Network, by Zhou, Published 1988.
Fall Detection Using Modular Neural Networks with Back-projected Optical Flow, by Huang, Published 2007.
Graham the Surf Hippo User Manual Version 3.0 B". Unite de Neurosciences Integratives et Computationnelles Institut Federatif de Neurobiologie Alfred Fessard CNRS. France. Mar. 2002 [retrieved Jan. 16, 2014]. [retrieved biomedical.univ-paris5.fr ]".
Miller III, "Real-Time Application of Neural Networks for Sensor-Based Control of Robots with Vision", IEEE Transactions on Systems, Man, and Cypernetics Jul./Aug. 1989, pp. 825-831, vol. 19, No. 4.
Specification, figures and EFS receipt of U.S. Appl. No. 14/244,888, filed Apr. 3, 2014 and entitled "Learning apparatus and methods for control of robotic devices via spoofing" (100 pages).
Specification, figures and EFS receipt of U.S. Appl. No. 14/244,890, filed Apr. 3, 2014 and entitled "Apparatus and methods for remotely controlling robotic devices" (91 pages).
Specification, figures and EFS receipt of U.S. Appl. No. 14/244,892, filed Apr. 3, 2014 and entitled—"Spoofing remote control apparatus and methods" (95 pages).
Specification, figures and EFS receipt of U.S. Appl. No. 14/265,113, filed Apr. 29, 2014 and entitled "Trainable convolutional network apparatus and methods for operating a robotic vehicle" (71 pages).
Specification, figures and EFS receipt of U.S. Appl. No. 14/285,385, filed May 22, 2014 and entitled "Apparatus and methods for real time estimation of differential motion in live video" (42 pages).
Specification, figures and EFS receipt of U.S. Appl. No. 14/285,414, filed May 22, 2014 and entitled "Apparatus and methods for distance estimation using multiple image sensors" (63 pages).
Specification, figures and EFS receipt of U.S. Appl. No. 14/285,466, filed May 22, 2014 and entitled "Apparatus and methods for robotic operation using video imagery" (64 pages).
Specification, figures and EFS receipt of U.S. Appl. No. 14/321,736, filed Jul. 1, 2014 and entitled "Optical detection apparatus and methods" (49 pages).
Specification, figures and EFS receipt of U.S. Appl. No. 14/326,374, filed Jul. 8, 2014 and entitled "Apparatus and methods for distance estimation using stereo imagery" (75 pages).
Specification, figures and EFS receipt of U.S. Appl. No. 14/489,242, filed Sep. 17, 2014 and entitled "Apparatus and methods for remotely controlling robotic devices" (100 pages).
Specification, figures and EFS receipt of U.S. Appl. No. 14/542,391, filed Nov. 14, 2014 and entitled "Feature detection apparatus and methods for training of robotic navigation" (83 pages).
Specification, figures and EFS receipt of U.S. Appl. No. 14/588,168, filed Dec. 31, 2014 and entitled "Apparatus and methods for training robots" (101 pages).
Specification, figures and EFS receipt of U.S. Appl. No. 14/637,138, filed Mar. 3, 2015 and entitled "Salient features tracking apparatus and methods using visual initialization" (66 pages).
Specification, figures and EFS receipt of U.S. Appl. No. 14/637,164, filed Mar. 3, 2015 and entitled "Apparatus and methods for tracking salient features" (66 pages).
Specification, figures and EFS receipt of U.S. Appl. No. 14/637,191, filed Mar. 3, 2015 and entitled "Apparatus and methods for saliency detection based on color occurrence analysis" (66 pages).
Specification, figures and EFS receipt of U.S. Appl. No. 14/705,487, filed May 6, 2015 and entitled "Persistent predictor apparatus and methods for task switching" (119 pages).
Visual Navigation with a Neural Network, by Hatsopoulos, Published 1991.
Kalman Filter; wikipedia.

\* cited by examiner

APPARATUS AND METHODS FOR ONLINE TRAINING OF ROBOTS

CROSS-REFERENCE TO RELATED APPLICATIONS

This application is related to co-owned and co-pending U.S. patent application Ser. No. 14/070,239, filed contemporaneously herewith on Nov. 1, 2013 and entitled "REDUCED DEGREE OF FREEDOM ROBOTIC CONTROLLER APPARATUS AND METHODS", and co-owned and co-pending U.S. patent application Ser. No. 14/070,269, filed contemporaneously herewith on Nov. 1, 2013 and entitled "APPARATUS AND METHODS FOR OPERATING ROBOTIC DEVICES USING SELECTIVE STATE SPACE TRAINING"; each of the foregoing being incorporated herein by reference in its entirety.

This application is also related to co-pending and co-owned U.S. patent application Ser. No. 14/040,520, entitled "APPARATUS AND METHODS FOR TRAINING OF ROBOTIC CONTROL ARBITRATION", filed Sep. 27, 2013; co-pending and co-owned U.S. patent application Ser. No. 14/040,498, entitled "ROBOTIC CONTROL ARBITRATION APPARATUS AND METHODS", filed Sep. 27, 2013; co-owned U.S. patent application Ser. No. 13/953,595 entitled "APPARATUS AND METHODS FOR CONTROLLING OF ROBOTIC DEVICES", filed Jul. 29, 2013; co-pending and co-owned U.S. patent application Ser. No. 13/918,338 entitled "ROBOTIC TRAINING APPARATUS AND METHODS", filed Jun. 14, 2013; co-pending and co-owned U.S. patent application Ser. No. 13/918,298 entitled "HIERARCHICAL ROBOTIC CONTROLLER APPARATUS AND METHODS", filed Jun. 14, 2013; co-pending and co-owned U.S. patent application Ser. No. 13/918,620 entitled "PREDICTIVE ROBOTIC CONTROLLER APPARATUS AND METHODS", filed Jun. 14, 2013; co-pending and co-owned U.S. patent application Ser. No. 13/907,734 entitled "ADAPTIVE ROBOTIC INTERFACE APPARATUS AND METHODS", filed May 31, 2013; co-pending and co-owned U.S. patent application Ser. No. 13/842,530 entitled "ADAPTIVE PREDICTOR APPARATUS AND METHODS", filed Mar. 15, 2013; co-owned U.S. patent application Ser. No. 13/842,562 entitled "ADAPTIVE PREDICTOR APPARATUS AND METHODS FOR ROBOTIC CONTROL", filed Mar. 15, 2013; co-owned U.S. patent application Ser. No. 13/842,616 entitled "ROBOTIC APPARATUS AND METHODS FOR DEVELOPING A HIERARCHY OF MOTOR PRIMITIVES", filed Mar. 15, 2013; co-owned U.S. patent application Ser. No. 13/842,647 entitled "MULTICHANNEL ROBOTIC CONTROLLER APPARATUS AND METHODS", filed Mar. 15, 2013; and co-owned U.S. patent application Ser. No. 13/842,583 entitled "APPARATUS AND METHODS FOR TRAINING OF ROBOTIC DEVICES", filed Mar. 15, 2013; each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates to machine learning and training of robotic devices.

2. Background

Robotic devices may be used in a variety of applications, such as manufacturing, medical, safety, military, exploration, and/or other applications. Some existing robotic devices (e.g., manufacturing assembly and/or packaging robots) may be programmed in order to perform various desired functions. Some robotic devices (e.g., surgical robots) may be remotely controlled by humans. Some robotic devices may learn to operate via exploration.

Programming robots may be costly and remote control may require a human operator. Furthermore, changes in the robot model and/or environment may require changes in the programming code. Remote control typically relies on user experience and/or agility that may be inadequate when dynamics of the control system and/or environment (e.g., an unexpected obstacle appears in path of a remotely controlled vehicle) change rapidly.

SUMMARY

One aspect of the disclosure relates to a robotic apparatus comprising a controllable actuator, a sensor module, and an adaptive controller. The sensor module may be configured to provide information related to an environment surrounding the robotic apparatus. The adaptive controller may be configured to produce a control instruction for the controllable actuator in accordance with the information provided by the sensor module. The control instruction may be configured to cause the robotic apparatus to execute a target task. Execution of the target task may be characterized by the robotic apparatus traversing one of a first trajectory or a second trajectory. The first trajectory and the second trajectory may each have at least one different parameter associated with the environment. The adaptive controller may be operable in accordance with a supervised learning process configured based on a training signal and a plurality of trials. At a given trial of the plurality of trials, the control instruction may be configured to cause the robot to traverse one of the first trajectory or the second trajectory. The teaching input may be configured based on the control signal. The teaching input may be configured to strengthen a trajectory selection by the controller such that, based on the first trajectory being selected for a first trial, the first trajectory is more likely to be selected during one or more trials subsequent to the first trial.

Another aspect of the disclosure relates to a processor-implemented method of operating a robot. The method may be performed by one or more processors configured to execute computer program instructions. The method may comprise: operating, using one or more processors, a robot to perform a task, the task performance including traversing a first trajectory or a second trajectory; and based on a selection of the first trajectory by the robot, providing a teaching signal. The task may be associated with an object within the robot's environment. The robot may be configured to receive sensory input characterizing the object. The first trajectory selection may be configured based on a predicted control output configured in accordance with the characterization of the object. The teaching signal may be configured to confirm selection of the first trajectory over the second trajectory by the robot.

In some implementations, the selection strengthening may be characterized by an increased probability of the robot selecting the first trajectory compared to a probability of the robot selecting the first trajectory in an absence of the teaching input.

Yet another aspect of the disclosure relates to an adaptive controller apparatus comprising one or more processors configured to execute computer program instructions that, when executed, cause a robot to perform a target task. The target task may be performed at least by: at a first time instance, causing the robot to execute a first action in accordance with sensory context; and at a second time instance subsequent to the first time instance, causing the robot to execute the first action based on the sensory context and a teaching signal. Performing the target task may be based on an execution of the first action or the second action. The teaching signal may be based on the robot executing the first action at the first time instance and may be configured to assist execution of the first action at the second time instance.

In some implementations, at a given time instance, the robot may be configured to execute one of the first action or the second action. The execution of the first action at the first time instance may bias the robot to execute the first action at a subsequent time instance.

In some implementations, the bias may be characterized by a probability of execution of the first action at the second time instance being greater than a probability of execution of the second action at the second time instance.

In some implementations, the teaching signal may be configured to reduce a probability of a composite action being executed at the second time instance. The composite action may be configured based on a combination of the first action and the second action.

In some implementations, the execution of the first action at the first time instance may be based on an output of a random number generator.

In some implementations, the controller apparatus may be operable in accordance with a supervised learning process configured based on the teaching input. The first action execution at the first time instance and the second time instance may be configured based on a first control signal and a second control signal, respectively, provided be the learning process. The teaching input may be configured to provide an association between the sensory context and the first action so as to reduce time associated with the provision of the second control signal compared to the signal provisioning in an absence of the teaching input.

In some implementations, the learning process may be configured based on a neuron network comprising a plurality of neurons communicating via a plurality of connections. Individual connections may provide an input into a given one of the plurality of neurons are characterized by a connection efficacy configured to affect operation of the given neuron. The association development may comprise adjustment of the connection efficacy based on the based on the teaching input and the first control signal.

In some implementations, the first action and the second action may be characterized by a different value of a state parameter associated with the environment. The state parameter may be selected from the group consisting of a spatial coordinate, robot's velocity, robot's orientation, and robot's position.

In some implementations, the controller apparatus may be embodied in the robot. Responsive to the sensory context comprising a representation of an obstacle, the target task may comprise an avoidance maneuver executed by the robot. Responsive to the sensory context comprising a representation of a target, the target task may comprise an approach maneuver executed by the robot.

In some implementations, the first action execution may be configured based on a control signal. The control signal may be updated at time intervals shorter than one second. The first time instance and the second time instance may be separated by an interval that is no shorter than one second. The teaching signal may be provided via a wireless remote control device.

In some implementations, the training input may be provided by a computerized entity via a wireless interface.

In some implementations, the robot may comprise an autonomous platform. The controller apparatus may be embodied on the platform. The training input may be provided by a computerized module comprising a proximity indication configured to generate a signal based on an object being within a given range from the platform.

In some implementations, the controller apparatus may be operable in accordance with a learning process configured based on the teaching signal. The context may comprise information indicative of an object within robot's environment. The first action execution may be based on a first predicted control output of the learning process configured in accordance with the context. The second action execution may be based on a second predicted control output of the learning process configured in accordance with the context and the teaching signal.

In some implementations, the first and the second predicted control output may be determined based on output of an adaptive predictor module operable in accordance with supervised learning process configured based on a teaching input. The supervised learning process may be configured to combine the teaching signal with the first control signal at the first time instance to produce a combined signal. The teaching input at the second time instance may be configured based on the combined signal.

In some implementations, the supervised learning process may be configured based on a backward propagation of an error. The combined signal may be determined based on a transform function configured based on a union operation.

In some implementations, the combined signal may be determined based on a transform function configured based on one or more operations including an additive operation cartelized by a first weight and a second weight. The first weight may be applied to a predictor output. The second weight may be applied to a teaching input.

In some implementations, a value of the first weight at the first time instance may be greater than the value of the first weight at the second time instance. A value of the second weight at the first time instance may be lower than the value of the second weight at the second time instance.

In some implementations, the robot may comprise a mobile platform. The controller apparatus may be embodied on the platform. The sensory context may be based on a visual input provided by a camera disposed on the platform.

Yet another aspect of the disclosure relates to a method of increasing a probability of action execution by a robotic apparatus. In one embodiment, the method includes: receiving a sensory context from a sensor; at a first time instance, executing a first action with the robotic apparatus in accordance with the sensory context; at a second time instance subsequent to the first time instance, determining with an adaptive controller whether to execute the first action based on the sensory context received from the sensor and a teaching input received from a user interface during the first time instance; and executing the first action with the robotic apparatus in accordance with the determination of the adaptive controller. In one variant thereof, a target task comprises at least the first action; and increasing or decreasing a probability of execution of the first action is based on the teaching input, the teaching input having an effectiveness value determined by the adaptive controller from the execution of the first action at one or more time instances, where the effectiveness value is reduced after a threshold number of the one or more time instances.

In one variant, the determining whether to execute the first action further comprises determining whether to execute a second action by the adaptive controller; and the method further comprises executing the second action with the robotic apparatus in accordance with the determination of whether to execute the second action.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
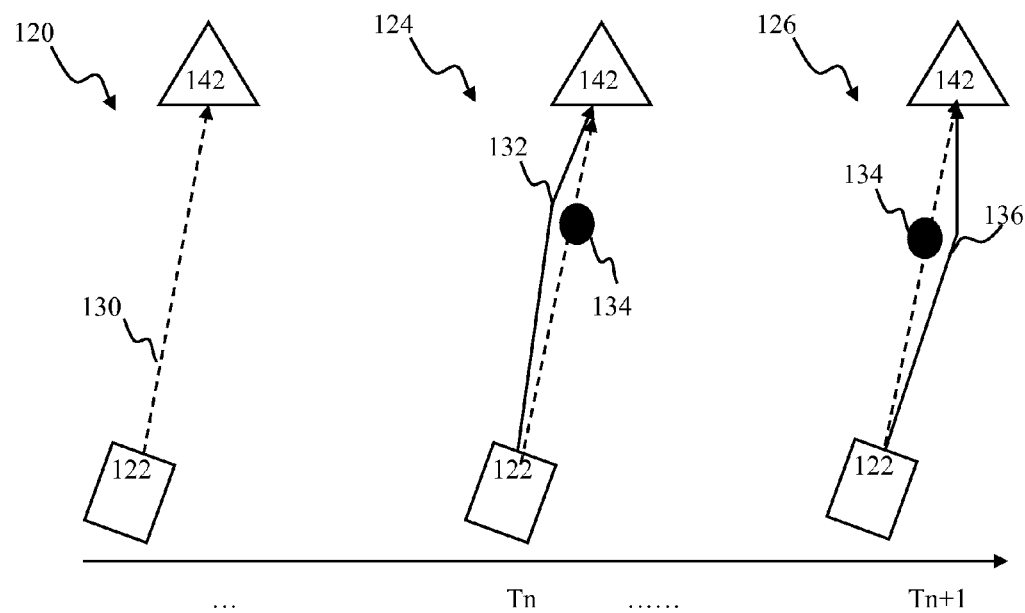
FIG. 1 is a graphical illustration depicting trajectories used in object approach by a robot, in accordance with one or more implementations.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be electrical, optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB®, PASCAL, Python®, assembly language, markup languages (e.g., HTML, SGML, XML, VoXML), object-oriented environments (e.g., Common Object Request Broker Architecture (CORBA)), Java® (e.g., J2ME®, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of elements in or on to the surface of a thin substrate. By way of non-limiting example, integrated circuits may include field programmable gate arrays (e.g., FPGAs), a programmable logic device (PLD), reconfigurable computer fabrics (RCFs), application-specific integrated circuits (ASICs), printed circuits, organic circuits, and/or other types of computational circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, and/or other), USB (e.g., USB2), Ethernet (e.g., 10/100, 10/100/1000 (Gigabit Ethernet), 10-Gig-E, and/or other), MoCA, Coaxsys (e.g., TVnet™), radio frequency tuner (e.g., in-band or OOB, cable modem, and/or other), Wi-Fi (802.11), WiMAX (802.16), PAN (e.g., 802.15), cellular (e.g., 3G, LTE/LTE-A/TD-LTE, GSM, and/or other), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Apparatus and methods for online training of robotic devices are disclosed herein. Robotic devices may be trained to perform a target task (e.g., recognize an object, approach a target, avoid an obstacle, and/or other tasks). In some implementations, performing the task may be achieved by the robot by following one of two or more spatial trajectories. By way of an illustration, a robotic vacuum apparatus may avoid a chair by passing it on the left or on the right. A training entity may assist the robot in selecting a target trajectory out of two or more available trajectories. In one or more implementations, the training entity may comprise a human user and/or a computerized controller device.

The robot may comprise an adaptive controller configured to generate control commands based on one or more of the teaching signal, sensory input, performance measure associated with the task, and/or other information. Training may comprise a plurality of trials. During one or more first trials, the trainer may observe operation of the robot. The trainer may refrain from providing the teaching signal to the robot. The robot may select one of the two trajectories (e.g., initialize a maneuver to the left of the chair). Upon observing the trajectory choice by the robot, the trainer may provide a teaching input configured to indicate to the robot a target trajectory. In some implementations, such teaching input may comprise a left turn control command issued by the trainer via a remote interface device (e.g., a joystick). The teaching input may be configured to affect robot's trajectory during subsequent trials so that probability of the robot selecting the same trajectory (e.g., passing the obstacle on the left) may be increased, compared to a random trajectory selection, and/or trajectory selection by the robot in absence of the teaching input. Upon completing a sufficient number of trials, the robot may be capable of consistently navigating the selected trajectory in absence of the teaching input.

Online robot training methodology described herein may enable more reliable decision making and reduce confusion when operating robotic controllers in order to perform a target task via two or more trajectories.

Figure 2A:
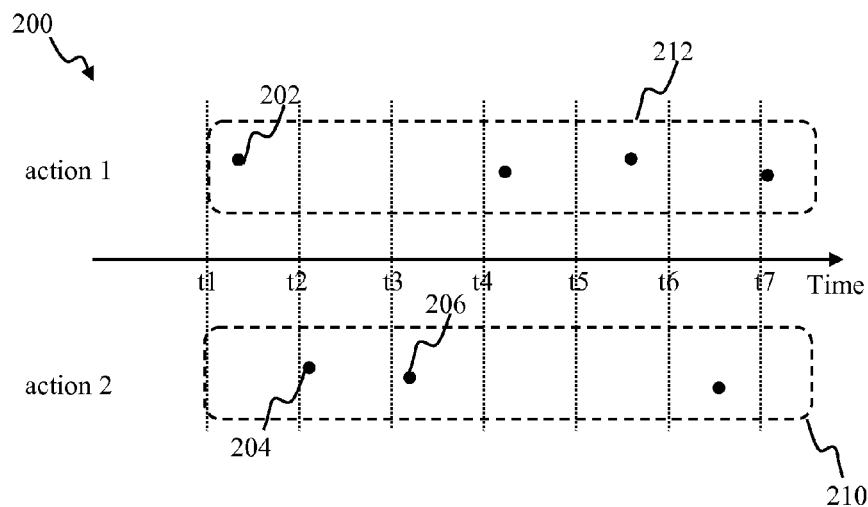
FIG. 2A is a plot depicting action selection by a robot in absence of online training input, in accordance with one or more implementations.

FIG. 1 illustrates an exemplary trajectory configuration useful with online learning methodology described herein. A robotic device 122 may be configured to approach a target 142 along a trajectory 130, as shown by configuration 120 in FIG. 1. The device 122 may be trained to approach the target 142 during one or more trials, as illustrated by configurations 124, 126 in FIG. 1. During trials 124, 126 an obstacle 134 may be present between the robot and the target. The controller of the robot may select to avoid the obstacle 142 along trajectory 132, e.g., to the left of the obstacle; and/or along trajectory 136, e.g. to the right of the obstacle. The trajectories 132, 136 may correspond to two actions and/or behaviors. In some offline learning implementations, the robot may select to approach the target 142 using one (e.g., 132) or the other trajectory (e.g., 136). FIG. 2A illustrates action selection by a robot in absence of online training input, in accordance with one or more implementations. Data shown in FIG. 2A depict selection of action 1 (illustrated by the action portion 212), and selection of action 2, (illustrated by the action portion 210) by the robot 122 during a plurality of trials, indicated by vertical broken lines denoted by time instances t1, t2, t3, t4, t5, t6, t7. The action 1, denoted by the action group 212 in FIG. 2A may correspond to the trajectory 132 in FIG. 1. The action 2, denoted by the action group 210 in FIG. 2A may correspond to the trajectory 136 in FIG. 1

As shown in FIG. 2A by actions 202, 204, 206 during consecutive trials (t1 to t2), (t2 to t3), (t3 to t4), the robot (and/or the trainer) may select one trajectory (202) or the other (204, 206). Such trajectory selection may provide inconsistent input into the controller of the robot and may require additional computational resources in order to enable the robot to consistently perform the target action (e.g. approach the object using the same action, e.g., the trajectory 132 or 136 of FIG. 1).

Figure 2B:
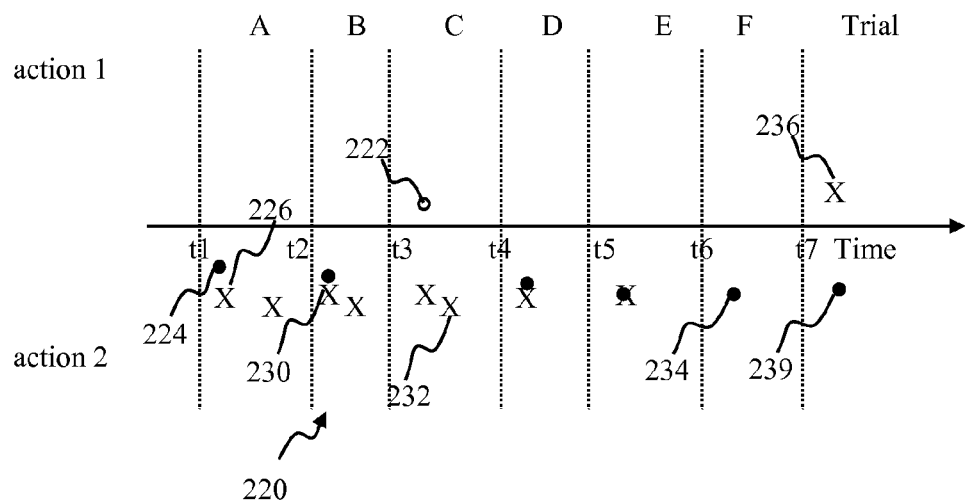
FIG. 2B is a plot depicting action selection by a robot during multiple training iterations configured using online training input, in accordance with one or more implementations.

FIG. 2B depicts action selection by a robot configured using online training input, in accordance with one or more implementations. Data shown in FIG. 2B may correspond to the robot 122 learning to approach the object 142 and comprise a plurality of trials A. B, C, D, E, F indicated by vertical broken lines denoted by time instances t1, t2, t3, t4, t5, t6, t7. The action 1, denoted by the open circle 222 in FIG. 2B may correspond to the trajectory 132 in FIG. 1. The action 2, denoted by the solid circle group 220 in FIG. 2B may correspond to the trajectory 136 in FIG. 1.

Figure 2C:
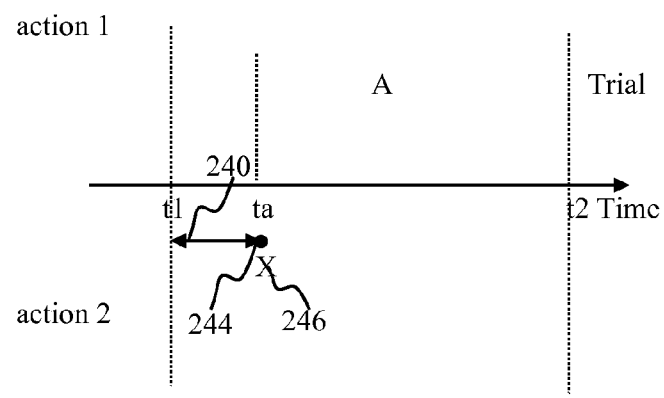
FIG. 2C is a plot depicting action selection for a given training iteration of the online training process of FIG. 2C, in accordance with one or more implementations.

FIG. 2C depicts an expanded view of the action selection by the robot during one of the trials shown in FIG. 2B, in accordance with one or more implementations.

During one of the trials (e.g., trial A in FIG. 2B or 2C), the robot may select to approach the target using the trajectory 136 (e.g., select action 2 as shown by the solid circle 224 in FIG. 2B and circle 244 in FIG. 2C). The action 2 selection 224, 244 may correspond to the robot turning right by 10°. The trainer, may observe action selection by the robot during an initial portion (shown by the arrow 240 in FIG. 2C) of the trial A. Based on observing the robot turn of 10°, the trainer may evaluate the action by robot versus a target action associated with navigation of the trajectory 136. In some implementations, the target action may comprise a 20° turn.

At time to in FIG. 2C, the trainer may provide a teaching (shown by symbol 'X' 246 in FIG. 2C) indicating to the robot to continue selecting the action 2 and the target turn for the action 2. It is noteworthy that the trainer input 246 is configured to 'follow' the action selection of the robot.

Returning now to FIG. 2B, based on the action selection 224 and one or more the teaching input 226 during the trial A, the robot may select the action 2 during the trial B, as shown by the solid circle 230. In some implementations, due to, e.g., variability in sensor input, the robot may select an alternate trajectory (e.g., the action 1) during trial C, as depicted by the open circle 228. Upon observing the robot's selection 228 that may be inconsistent with the prior selections 224, 230, the trainer may timely provide the teaching input 232 indicative of the target trajectory (e.g., the action 2). The teaching input 232 may cause the robot to resume the action 2 selection during the trial D, E, F. In some implementations, the trainer may refrain from providing the teaching input upon observing that the robot's selection matches the target selection, as illustrated by absence of the teaching input associated with the robot selection 234 during trial F.

The training configuration shown and described with respect to FIG. 2B may facilitate implementing a hybrid mode of robot operation, wherein the trainer may (on demand) provide corrections (e.g., 232) in real time to the robot based on observing a discrepancy between the target behavior and the observed behavior. During the rest of the time the robot may be referred to as being in the operating mode wherein no learning may occur. in operating mode only. No mode switching (e.g., learning to operation and/or operation to learning) may be needed to implement online training functionality described herein.

In one or more implementations, the action selection by the robotic controller may be based on operation of an adaptive predictor apparatus configured to select an action based on sensory input (e.g., position of an object and/or an obstacle) as described, e.g., in U.S. patent application Ser. No. 13/842,530 filed Mar. 15, 2013 and entitled "ADAPTIVE PREDICTOR APPARATUS AND METHODS", and/or U.S. patent application Ser. No. 13/842,583 filed Mar. 15, 2013 and entitled "APPARATUS AND METHODS FOR TRAINING OF ROBOTIC DEVICES", each of the foregoing being incorporated herein by reference in its entirety. The predictor may be operable in accordance with a supervised learning process, a reinforcement learning process, and/or a combination thereof. As described, e.g., in the '583 application referenced above, the training input may be combined with the predictor output by a combiner characterized by a transfer function. In one or more implementations, the combiner transfer function may comprise a union and/or additive (e.g., a weighted sum) operation. The robot platform may be operable using output of the combiner.

In one or more implementations, the learning process of the robot may be configured to assign an increased weight to the action indicated by the training input compared to weight assigned to the action being selected by the predictor during beginning of training (e.g., duration of first 10%-20% of trials). Such weight configuration may reduce probability of selecting action 1 based on the predictor output as shown by the open circle 228 in FIG. 2B. Open circles in FIG. 2B depict action selection by the predictor that do not match the training input and are diminished (e.g., weighted down) from the combined control output.

During the latter portion of the training (e.g., subsequent to duration of the first 10%-20% of trials) the learning process of the robot may be configured to assign a reduced weight to the action indicated by the training input and an increased weight to the action being selected by the predictor. Such weight configuration may reduce a probability of selecting action 1 based on the trainer input (e.g., 236 in FIG. 2B) that may be inconsistent with the previous action selections (e.g., 224, 234 in FIG. 2B). The weight configuration described above may enable the trainer to provide a greater influence during early stages of training Training influence may diminish as training progresses and/or performance of the robot increases. In one or more implementations, the performance increase may be determined based on a reduced variability between consecutive trajectories (e.g., 132, 136) being selected in order to perform a given over a number of trials.

In some implementations of the robot learning process, based on a teaching input that is inconsistent (e.g., as shown by the teaching input 236 to select action 1 in FIG. 2B) with the robot's action selection and prior selected actions, the robot may still execute the action 2 selected by the robot (e.g., 239 in FIG. 2B) during that trial. The inconsistent teaching input (e.g., 236) may reduce probability of the action 2 being selected during one or more trials subsequent to the action selection 239.

In one or more implementations of the robot learning process, the inconsistent teaching input may cause the robot to execute the action indicated by the teaching input (e.g., the action 1 associated with the input 236 in FIG. 2B) that is inconsistent (e.g., as shown by the teaching input 236 to select action 1 in FIG. 2A). The inconsistent teaching input (e.g., 236) may reduce probability of the action 2 being selected during one or more trials subsequent to the action selection 239. In some implementations of the robot learning process, the robot may be configured to execute an action that is a combination between the teaching input and the predicted signal (e.g., the robot may execute a 15° right turn based on the teaching input indicating a 20° right turn and a predicted signal associated with 10° right turn.

Figure 3:
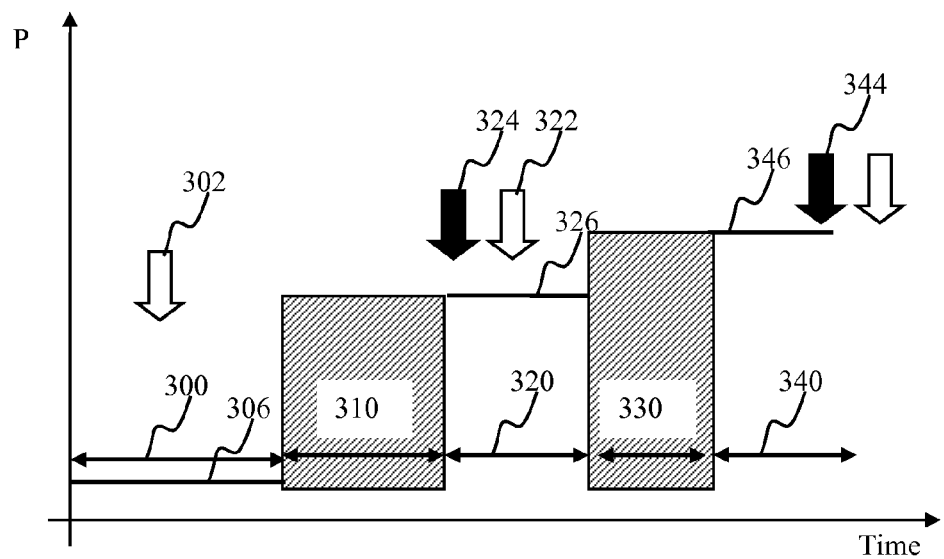
FIG. 3 is a graphical illustration depicting an off-line training performance of a robotic device to perform an action, in accordance with one or more implementations.

FIG. 3 illustrates responsiveness of a robotic controller to offline training (e.g., influence of offline training input on trajectory selection by the controller), in accordance with one or more implementations. As used herein, the term "offline" may be used to refer to training implementations wherein trailing time intervals and actual operation time intervals do not overlap with one another.

During time interval 300 in FIG. 3, robotic device may be operated to perform a target task based on a training input 302 provided to a robotic controller. In one or more implementations, the controller may comprise the controller 802, described in detail with respect to FIG. 8 below, and embodied in a robotic device (e.g., 122 of FIG. 1 or the rover 900 of FIG. 9). The training input 302 may be recorded by the controller. The controller may be operable in accordance with a learning process, e.g., that is effectuated and/or facilitated by a neuron network. The network may comprise a plurality of computerized neurons interconnected by connections. Individual connections may be assigned, inter alia, a connection efficacy, which in general may refer to a magnitude and/or probability of input into a neuron affecting neuron output. The efficacy may comprise, for example a parameter (e.g., synaptic weight) used for adaptation of one or more state variables of post-synaptic neurons, e.g., as described in U.S. patent application Ser. No. 14/020,376, filed on Sep. 6, 2013 and entitled "APPARATUS AND METHODS FOR EVENT-BASED PLASTICITY IN SPIKING NEURON NETWORKS", the foregoing being incorporated herein by reference in its entirety. During the interval 300, the learning configuration of the controller (e.g., connection efficacy) may remain unchanged so no adaptation takes place. Controller output during the interval 300 may be configured solely based on the training input 302. The target task may comprise a target approach task that may be performed using two or more trajectories (e.g., 132, 136 in FIG. 1 and/or 202, 204 in FIG. 2A). The vertical axis in FIG. 3 depicts a measure of autonomy of the adaptive controller. In one or more implementations, the autonomy measure may be characterized by a weighting parameter W that may be assigned to output of the controller. In some implementations, the autonomy measure may be characterized by performance of the robot in the absence of training input.

Subsequently, during the interval 310, the controller learning process may be adapted based on the training input 302 and sensory input received during the interval 300. The sensory input may be provided, by a camera (e.g., 966 in FIG. 9) and may comprise information associated with objects within the environment of the robot. In some implementations, the camera may provide frames of pixels of luminance, refreshed at 25 Hz frame rate. However, it will be appreciated that, in one or more implementations, other frame rates may be used (whether regular or aperiodic). Duration of individual intervals 300, 320, 310, 330 may comprise multiple frame durations (e.g., 10 to 1000, or more).

The training input and controller trajectories obtained during the interval 300 may comprise a portion of first trajectories (e.g., 212 ion FIG. 2A) and a portion of second trajectories (e.g., 210 in FIG. 2A). In one or more implementations, the controller adaptation may comprise modification of network efficacy using any applicable methodologies such as described in, e.g., U.S. patent application Ser. No. 14/054,366, filed on Oct. 15, 2013 and entitled "APPARATUS AND METHODS FOR BACKWARD PROPAGATION OF ERRORS IN A SPIKING NEURON NETWORK", the foregoing being incorporated herein by reference in its entirety. In one or more implementations, controller adaptations performed during the interval 310 may be based on iterative learning comprised of multiple iterations. During a given iteration, current controller performance may be compared to a prior performance obtained for the preceding iteration. Based on the current performance being within a target range from the prior performance the iterative adaptation on may be concluded.

During an interval 320 subsequent to interval 310, the controller may be configured to operate the robot in order to perform the target task based on controller output 324. The controller output may be configured based on the adapted state of the learning process during the preceding interval 320. In one or more implementations, the controller input may be combined with the teaching input 322 during the interval 320. During the interval 320, the learning configuration of the controller (e.g., connection efficacy) may remain unchanged so no adaptation takes place. Controller output during the interval 320 may be configured based on the training input 322 and controller output obtained using the control process configuration determined during the interval 310. The teaching input 322 and the context obtained during the interval 320 may be stored for use during subsequent controller adaptations. Based on the adaptation performed during the interval 310, the controller measure of autonomy may increase from level 306 prior to adaptation to the level 326.

Subsequently, during the interval 330, the controller learning process may be adapted based on the training input 322 and sensory input received during the interval 320. The training input and controller trajectories obtained during the interval 320 may comprise a portion of first trajectories (e.g., 212 in FIG. 2A) and a portion of second trajectories (e.g., 210 in FIG. 2A). In one or more implementations, the controller adaptation may comprise modification of network efficacy using any applicable methodologies such as described above with respect to interval 310. Based on the adaptation performed during the interval 340, the controller measure of autonomy may increase from level 326 prior to adaptation 330 to the level 346. In one or more implementations, the controller output 344 during a subsequent interval 340 may be assigned a greater weight compared to the controller output weight corresponding to the interval 320.

The offline training process described with respect to FIG. 3 may be characterized by discrete learning (310, 330) and operational (300, 320) intervals comprising multiple input sensory frame durations. Training input and/or sensory input that may occur during one interval (e.g., 320) may not cause changes to controller output until a subsequent operational interval e.g., 340) that may occur 30 or more frames later.

Figure 4:
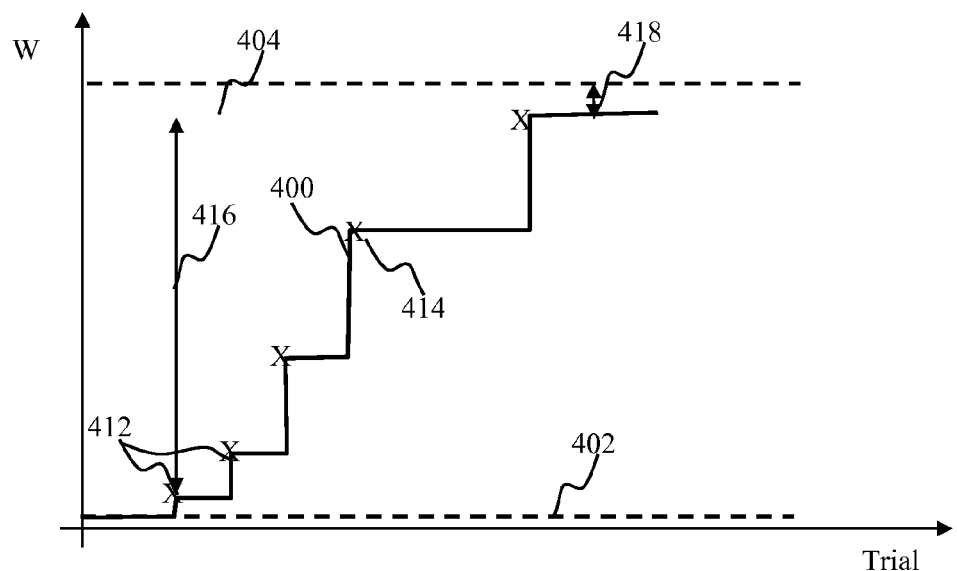
FIG. 4 is a graphical illustration depicting an online training performance of a robotic device to perform an action, in accordance with one or more implementations.

FIG. 4 illustrates performance of using online training of an adaptive controller of a robot, in accordance with one or more implementations. As used herein, the term "online" may be used to refer to training implementations wherein training time interval and operation time interval may overlap and/or coincide with one another. During online learning, a robot may navigate a trajectory based on control commands generated by a learning process of the robot. At a given time instance, the robot may receive a teaching input, modify the learning process based on the teaching input, and subsequently navigate the trajectory based on the modified process thus timely incorporating the teaching input. In some implementations, in a given online learning trial, configuration of the adaptive controller may be adjusted based on teaching input determined during the trial so as to determine controller output for that trial. Training methodologies such as described in connection with FIG. 4 may increase responsiveness of a robotic controller to input (e.g., influence of online training input on trajectory selection by the controller), obtain better performance, and/or a given performance in shorter time, compared to the offline training methodology described with respect to FIG. 3

During individual training trials illustrated and described with respect to FIG. 4, controller output may be combined with teaching input. The vertical axis in FIG. 4 denotes a measure of autonomy of the adaptive controller. In one or more implementations, the autonomy measure may be characterized by a weighting parameter W (depicted by curve 400) that may be assigned to output of the controller. The level 402 may denote an initial value of the parameter. In some implementations, the level 402 may be selected equal to zero so that the combined output is composed of the teaching input. The level 404 may denote a maximum value of the parameter W. In some implementations, the level 404 may be selected so as to produce the combined output composed solely of the controller output (full autonomy). In one or more implementations, the curve 400 may be used to describe intelligence and/or performance of the robot associated with performing of the target action.

Symbols 'X' in FIG. 4 denote occurrence of teaching input. In some implementations, the teaching input 412, 414 may correspond to a teacher indicating to the controller a target trajectory (e.g., the input 226 indicating the action 2 in FIG. 2). During one or more initial trials, the teaching input (e.g., denoted by symbols 'X' 412 in FIG. 4) may be used to adjust the controller learning process so as to influence control action determination by the controller. A magnitude of teaching input influence may be characterized by arrow 416. During one or more subsequent trials the teaching input (e.g., denoted by symbol 'X' 414 in FIG. 4), influence of the teaching input may be diminished, as depicted by arrow 418 that is shorter than the arrow 414.

Training configurations such as illustrated with respect to FIG. 4 may enable the adaptive controller perform learning process adaptation in real time while incorporating the training input. That is, training input (e.g., 412) that may be received during a given sensory frame may cause changes in the controller output during the same and/or a subsequent sensory frame. Such learning configuration may increase controller responsiveness and/or improve learning accuracy. Trajectory selection consistency may be further improved as the prior trajectory selection may be configured to bias future trajectory selections towards the target trajectory. The trajectory selection consistency may be based on teacher's ability to observe trajectory selection by the controller and to correct the trajectory selection, without the delay associated with the offline method.

Figure 5:
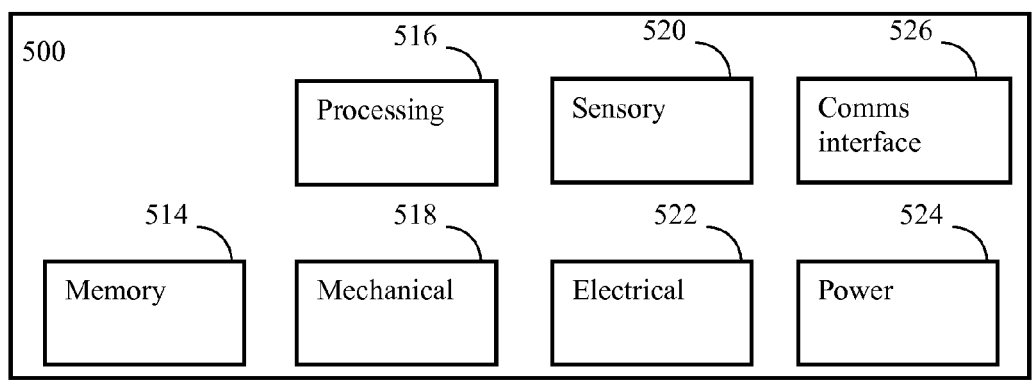
FIG. 5 is a functional block diagram illustrating a robotic controller apparatus for implementing, inter alia, online learning methodology, in accordance with one or more implementations.

FIG. 5 is a functional block diagram illustrating a robotic controller apparatus for implementing, inter alia, online learning methodology in accordance with one or more implementations.

Figure 9:
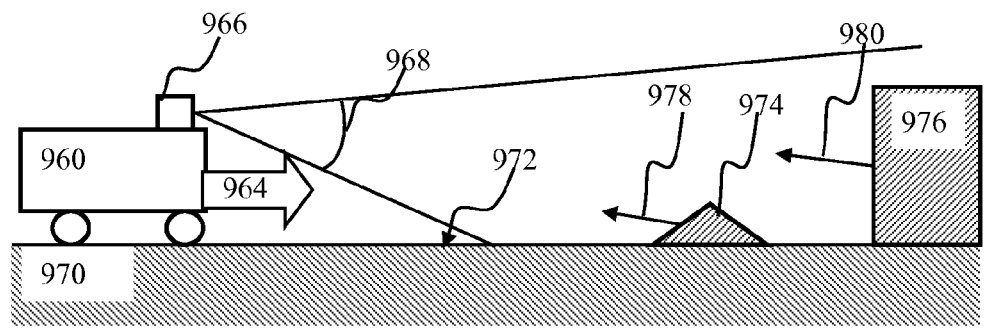
FIG. 9 is a graphical illustration depicting robotic apparatus comprising an adaptive controller apparatus of the disclosure configured for obstacle avoidance using online learning methodology, in accordance with one or more implementations.

The apparatus 500 may comprise a processing module 516 configured to receive sensory input from sensory block 520 (e.g., camera 966 in FIG. 9). In some implementations, the sensory module 520 may comprise audio input/output portion. The processing module 516 may be configured to implement signal processing functionality (e.g., object detection).

The apparatus 500 may comprise memory 514 configured to store executable instructions (e.g., operating system and/or application code, raw and/or processed data such as raw image frames and/or object views, teaching input, information related to one or more detected objects, and/or other information).

In some implementations, the processing module 516 may interface with one or more of the mechanical 518, sensory 520, electrical 522, power components 524, communications interface 526, and/or other components via driver interfaces, software abstraction layers, and/or other interfacing techniques. Thus, additional processing and memory capacity may be used to support these processes. However, it will be appreciated that these components may be fully controlled by the processing module. The memory and processing capacity may aid in processing code management for the apparatus 500 (e.g. loading, replacement, initial startup and/or other operations). Consistent with the present disclosure, the various components of the device may be remotely disposed from one another, and/or aggregated. For example, the instructions operating the online learning process may be executed on a server apparatus that may control the mechanical components via network or radio connection. In some implementations, multiple mechanical, sensory, electrical units, and/or other components may be controlled by a single robotic controller via network/radio connectivity.

The mechanical components 518 may include virtually any type of device capable of motion and/or performance of a desired function or task. Examples of such devices may include one or more of motors, servos, pumps, hydraulics, pneumatics, stepper motors, rotational plates, micro-electromechanical devices (MEMS), electroactive polymers, SMA (shape memory alloy) activation, and/or other devices. The sensor devices may interface with the processing module, and/or enable physical interaction and/or manipulation of the device.

The sensory devices 520 may enable the controller apparatus 500 to accept stimulus from external entities. Examples of such external entities may include one or more of video, audio, haptic, capacitive, radio, vibrational, ultrasonic, infrared, motion, and temperature sensors radar, lidar and/or sonar, and/or other external entities. The module 516 may implement logic configured to process user queries (e.g., voice input "are these my keys") and/or provide responses and/or instructions to the user. The processing associated with sensory information is discussed with respect to FIG. 5.

The electrical components 522 may include virtually any electrical device for interaction and manipulation of the outside world. Examples of such electrical devices may include one or more of light/radiation generating devices (e.g. LEDs, IR sources, light bulbs, and/or other), audio devices, monitors/displays, switches, heaters, coolers, ultrasound transducers, lasers, and/or other electrical devices. These devices may enable a wide array of applications for the apparatus 500 in industrial, hobbyist, building management, medical device, military/intelligence, and/or other fields.

The communications interface may include one or more connections to external computerized devices to allow for, inter alia, management of the apparatus 500. The connections may include one or more of the wireless or wireline interfaces discussed above, and may include customized or proprietary connections for specific applications. The communications interface may be configured to receive sensory input from an external camera, a user interface (e.g., a headset microphone, a button, a touchpad and/or other user interface), and/or provide sensory output (e.g., voice commands to a headset, visual feedback).

The power system 524 may be tailored to the needs of the application of the device. For example, for a small hobbyist robot or aid device, a wireless power solution (e.g. battery, solar cell, inductive (contactless) power source, rectification, and/or other wireless power solution) may be appropriate. However, for building management applications, battery backup/direct wall power may be superior, in some implementations. In addition, in some implementations, the power system may be adaptable with respect to the training of the apparatus 500. Thus, the apparatus 500 may improve its efficiency (to include power consumption efficiency) through learned management techniques specifically tailored to the tasks performed by the apparatus 500.

Figure 6:
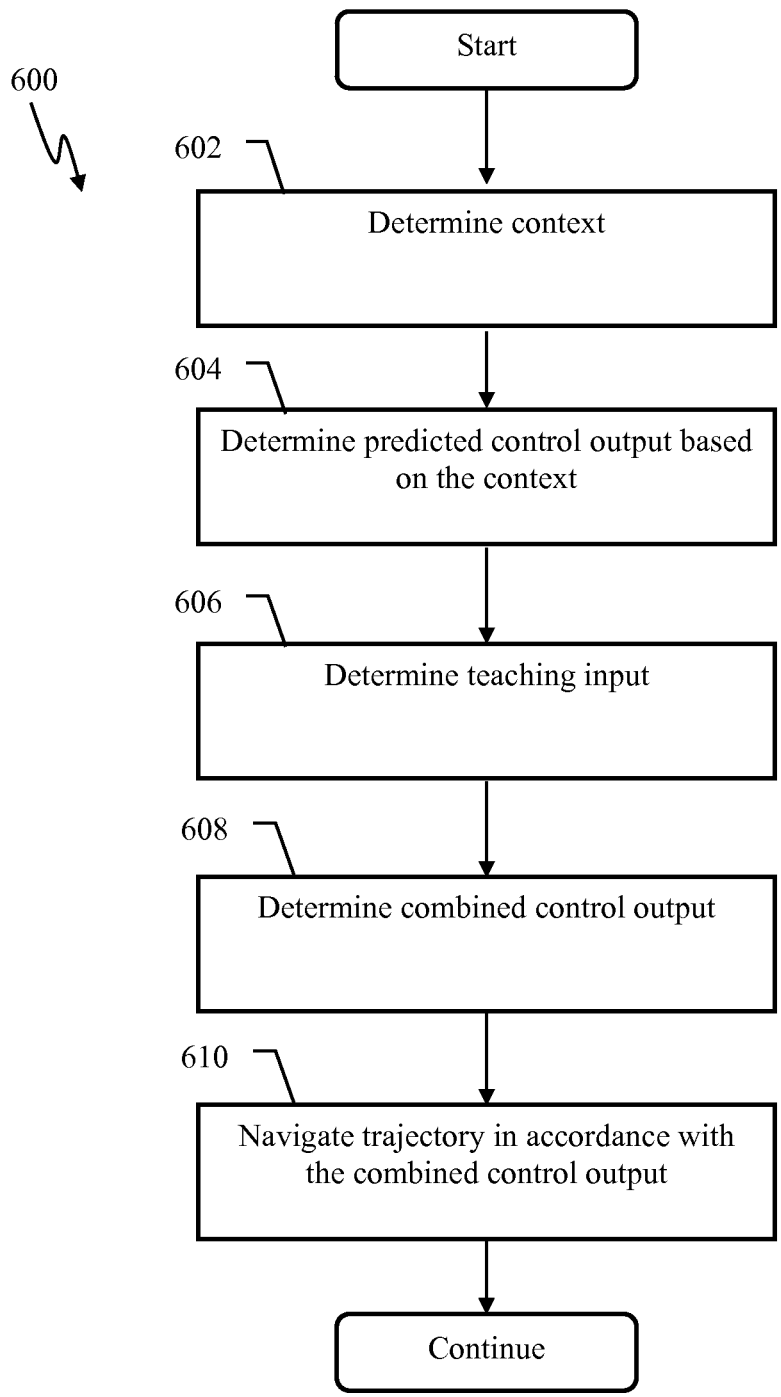
FIG. 6 is logical flow diagram illustrating a method of operating a robotic controller using online training methodology, in accordance with one or more implementations.
Figure 7:
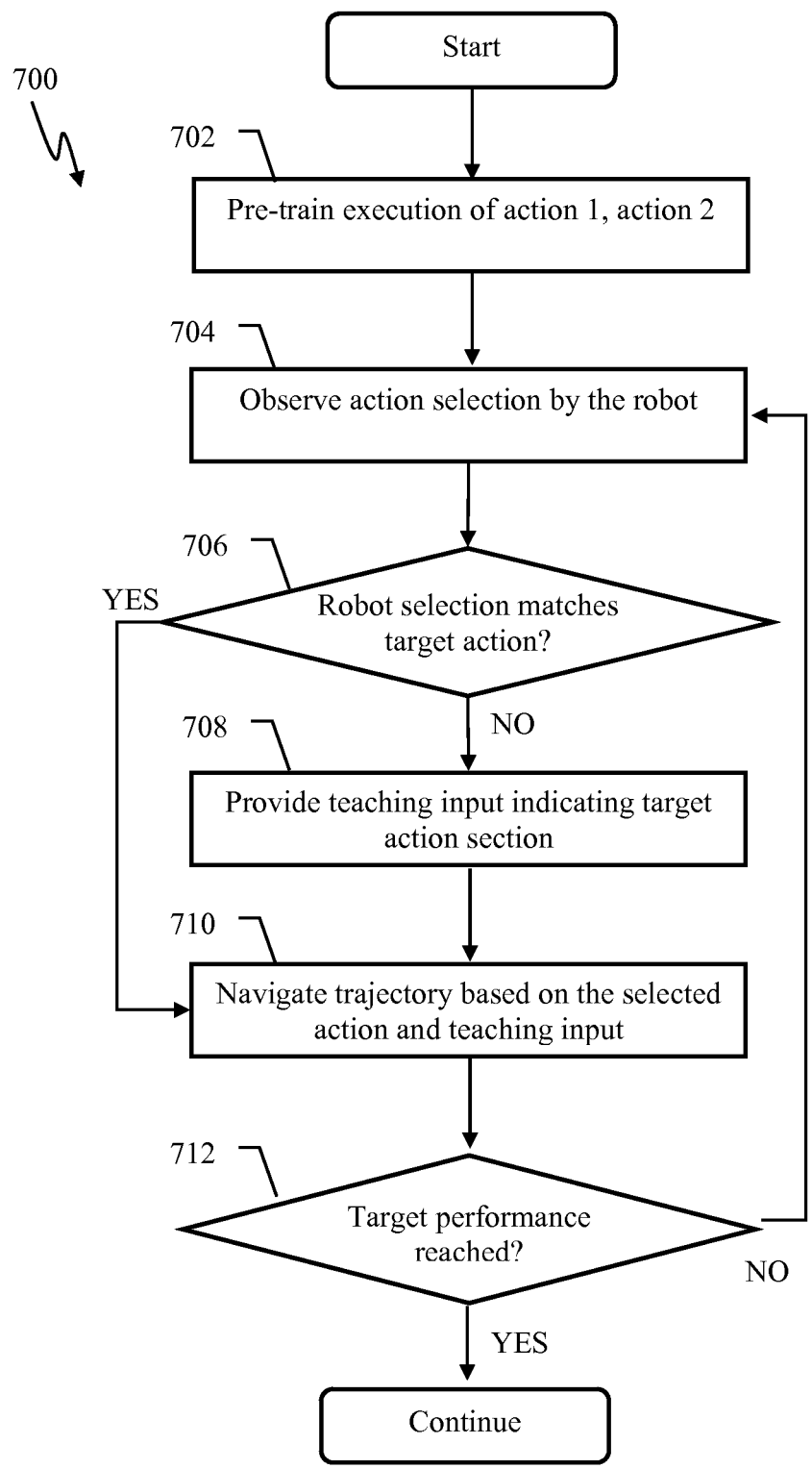
FIG. 7 is logical flow diagram illustrating a method of training a robotic device to navigate a trajectory using online training methodology, in accordance with one or more implementations.

FIGS. 6 and 7 illustrate methods 600, 700 of operating robots utilizing online training methodology of the disclosure. The operations of methods 600, 700 presented below are intended to be illustrative. In some implementations, method 600, 700 may be accomplished with one or more additional operations not described, and/or without one or more of the operations discussed. Additionally, the order in which the operations of method 600, 700 are illustrated in FIGS. 6 and 7 and described below is not intended to be limiting.

In some implementations, methods 600, 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600, 700 in response to instructions stored electronically on an electronic storage medium. The one or more processing devices may include one or more devices configured through hardware, firmware, and/or software to be specifically designed for execution of one or more of the operations of methods 600, 700.

FIG. 6 illustrates a method 600 of operating a robotic controller using online training methodology, in accordance with one or more implementations.

At operation 602 of method 600, a context may be determined. In some implementations, the context may comprise on or more aspects of sensory input (e.g., 806 in FIG. 8 and/or 1002 of FIG. 10, described below) and/or feedback that may be provided by robot platform to the controller. In one or more implementations, the sensory aspects may include an object being detected in the input, a location of the object, an object characteristic (color/shape), a sequence of movements (e.g., a turn), a characteristic of an environment (e.g., an apparent motion of a wall and/or other surroundings turning a turn and/or approach) responsive to the movement. In some implementation, the sensory input may be received based on performing one or more training trials of the robotic apparatus.

At operation 604, predicted control output may be determined consistent with the context. In one or more implementations, the context may comprise location of an obstacle (e.g., 134) relative a target (e.g., 142) and the control output may comprise one or more motor commands configured to navigate one of the trajectories (e.g., left/right 132/136, respectively in FIG. 1).

At operation 606, teaching input may be determined. In one or more implementations, the teaching input may be configured based on observing trajectory selection by the robotic controller. The teaching input may comprise, e.g., a motor control command (e.g., turn left) configured to cause the robot to follow the selected trajectory (e.g., 132 in FIG. 1).

At operation 608, combined control output may be determined. In one or more implementations, the combined output may comprise a combination of the predicted control output (e.g., 224 in FIG. 2B) and the teaching control signal (e.g., 226). The combined output may comprise, e.g., a motor control command (e.g., turn left) configured to cause the robot to follow the selected trajectory (e.g., 132 in FIG. 1).

At operation 610, the trajectory may be navigated in accordance with the combined control output determined at operation 608.

FIG. 7 illustrates a method 700 of training a robotic device to navigate a trajectory using online training methodology, in accordance with one or more implementations. In one or more implementations, the training may be effectuated by a trainer comprising a human operator and/or a computerized agent. The training may comprise multiple iteration (e.g., the trials A,B,C,D,E,F in FIG. 2B) wherein during a given iteration the robot may be configured to navigate a trajectory, e.g., the trajectory 132 or 136 in FIG. 1.

At operation 702, the robot may be trained to execute two or more actions (e.g., turn left/right). The action execution may be based on a sensory context (e.g., an image of an object in video frame, in one or more implementations.

At operation 704, the trainer may observe action selection by the robot. The action selection may be based on appearance of an obstacle (e.g., 134) in robot's sensory input. In one or more implementations, actions 1, 2 may comprise selection of the trajectory 132, 136, respectively, in FIG. 1.

At operation 706, the trainer may determine as to whether the action selected by the robot at operation 704 matches a target action. In one or more implementations, the target action may comprise a previously selected action (e.g., the action selection 230 in FIG. 2B may be considered as a match for the action 224 selected at a prior trial). During the first trial of the training, any action selected by the robot may be considered as the target action.

Responsive to a determination at operation 706 that the action selected by the robot at operation 704 does not match the target action, the method may proceed to operation 708 wherein a training input may be provided to the robot. In some implementations, the teaching input may be configured based on the trainer observing trajectory navigation by the robot associated with executing the action selected at operation 704. In one or more implementations, the teaching input may correspond to the signal 226 configured to indicate to a controller of the robot the target trajectory (e.g., a right turn of 20° versus the right turn of 10° or a left turn selected by the robot at operation 704). The learning process of the robot controller may be updated based on the selected action and the training input using any applicable methodologies, including these described in U.S. patent application Ser. No. 13/842,530 filed Mar. 15, 2013 and entitled "ADAPTIVE PREDICTOR APPARATUS AND METHODS", and/or U.S. patent application Ser. No. 13/842,583 filed Mar. 15, 2013 and entitled "APPARATUS AND METHODS FOR TRAINING OF ROBOTIC DEVICES", incorporated supra. In one or more implementations, the adaptation may comprise adjusting efficacy of network connections. In some implementations of learning configured based on a look-up table (LUT), the learning adaptation may comprise updating one or more LUT entries. Based on the adaptation, updated control output (e.g., the output 224 in FIG. 2B) may be determined.

Responsive to a determination at operation 706 that the action selected by the robot at operation 704 matches the target action, the method may proceed to operation 710 wherein the robot may navigate a trajectory based on the updated learning process, selected action and the teaching input. The trajectory navigation may be based on a predicted control output. In one or more implementations, the predicted control output may comprise output of an adaptive predictor operable in accordance with reinforcement and/or supervised learning process configured based on the sensory context. The predicted output may correspond to the signal 224 configured to cause the robot to select one of the two trajectories (actions).

At operation 712, a determination may be made as to whether a performance associated with the action execution by the robot matches a target level. The performance may be determined based on a consistency measure of the action selected at operation 704. In some implementations, the consistency may be determined based on a probability of the target action selection, a number of matches determined at operation 706, a number of mis-matches between a preceding selected action and the current selected action, and/or other.

Figure 8:
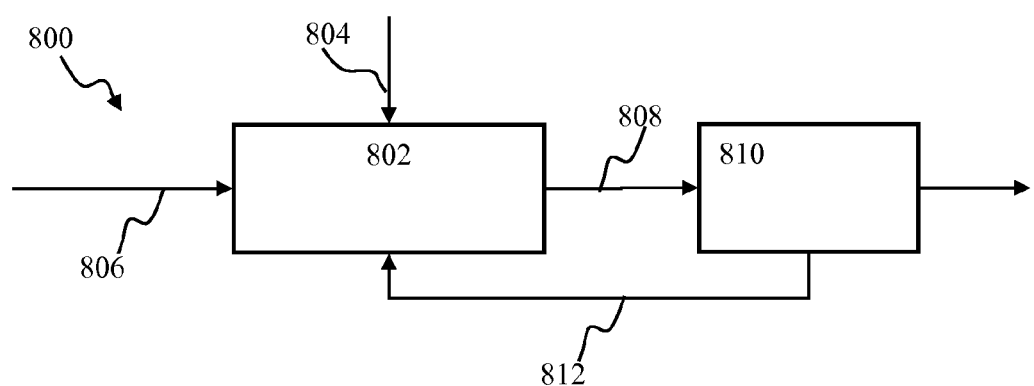
FIG. 8 is a block diagram illustrating an adaptive robotic apparatus adaptive controller apparatus configured for online learning, according to one or more implementations.

Online learning methodology described herein may be utilized for implementing adaptive controllers of robotic devices. FIG. 8 illustrates one or more implementations of an adaptive robotic apparatus 800 comprising the adaptive controller 802 and a robotic platform 810. The controller 802 may be configured to generate control output 808 for the robotic platform 810. The output 808 may comprise one or more motor commands (e.g., pan camera to the right), sensor acquisition parameters (e.g., use high resolution camera mode), commands to the wheels, arms, and/or other actuators on the robot, and/or other parameters and/or other information. The output 808 may be configured by the controller 802 based on one or more sensory inputs 806. The input 806 may comprise data used for solving a particular control task. In one or more implementations, such as those involving a robotic arm or autonomous robot, the signal 806 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as that involving object recognition, the signal 806 may comprise an array of pixel values in the input image, and/or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal 806 may comprise a target motion trajectory. The motion trajectory may be used to predict a future state of the robot on the basis of a current state and the target state. In one or more implementations, the signals in FIG. 8 may be encoded as spikes.

The controller 802 may be operable in accordance with a supervised learning process. In one or more implementations, the controller 802 may optimize performance (e.g., performance of the system 800 of FIG. 8) by minimizing average value of a performance function as described in detail in co-owned U.S. patent application Ser. No. 13/487,533 filed on Jun. 4, 2012 and entitled "STOCHASTIC SPIKING NETWORK LEARNING APPARATUS AND METHODS", now issued as U.S. Pat. No. 9,146,546, which is incorporated herein by reference in its entirety.

The adaptive controller 802 may comprise a parallel network multiple interconnected neurons. Individual neurons may be operable independent from one another thereby enabling parallel computations. Neurons may communicate with one another within the network using a variety of methods. In some implementations, the neurons may be configured to facilitate a rate-based process. Data may be encoded into a scalar and/or a vector for neuron output. In one or more implementations, the network (e.g., of the adaptive controller 802) may comprise spiking neurons, e.g., as described in the '533 application referenced above.

FIG. 9 depicts a mobile robotic apparatus that may be configured with an adaptive controller in accordance with the one or more implementations illustrated in FIG. 8, supra. The robotic apparatus 960 may comprise a camera 966. The camera 966 may be characterized by a field of view 968 (e.g., an extent of the observable world that may be captured by the camera lens at a given moment). The camera 966 may provide information associated with objects within the field-of-view. In some implementations, the camera 966 may provide frames of pixels of luminance, refreshed at 25 Hz frame rate. However, it will be appreciated that, in some implementations, other frame rates may be used (whether regular or aperiodic).

One or more objects (e.g., a floor 970, a stationary object 974, a moving object 976, and/or other objects) may be present in the camera field of view. The motion of the objects may result in a displacement of pixels representing the objects within successive frames, such as described in U.S.

patent application Ser. No. 13/689,717 filed on Nov. 30, 2012 and entitled "APPARATUS AND METHODS FOR OBJECT DETECTION VIA OPTICAL FLOW CANCELLATION", incorporated, supra.

Figure 10:
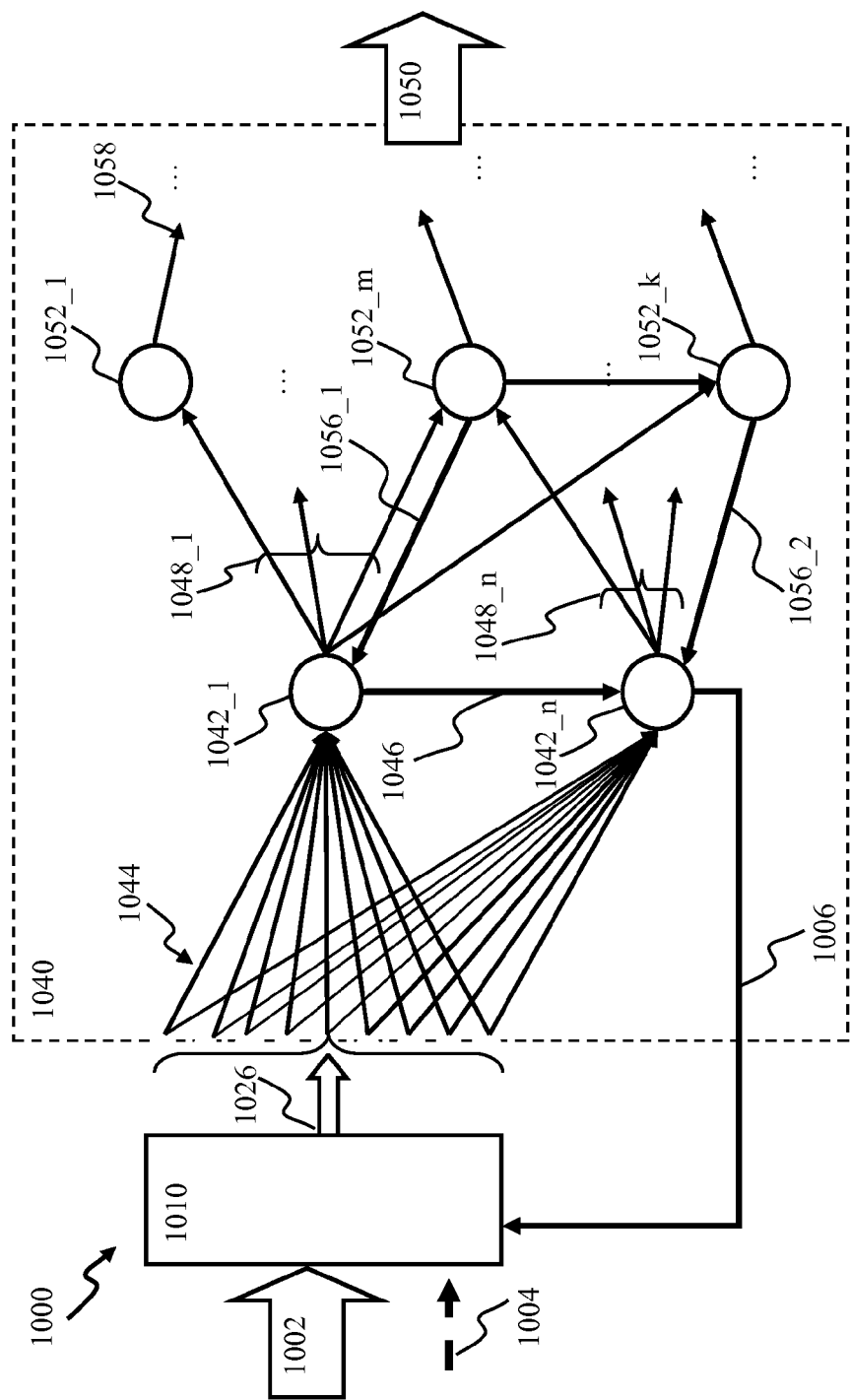
FIG. 10 is a block diagram illustrating a processing apparatus useful with an adaptive controller of a robotic device such as the one depicted in FIG. 9, in accordance with one or more implementations.

When the robotic apparatus 960 is in motion, such as shown by arrow 964 in FIG. 10, the optical flow estimated from the image data may comprise the self-motion component and the object motion component. By way of a non-limiting example, the optical flow measured by the rover of FIG. 9 may comprise one or more of (i) self-motion components of the stationary object 978 and the boundary (e.g., the component 972 associated with the floor boundary); (ii) component 980 associated with the moving objects 976 that comprises a superposition of the optical flow components due to the object displacement and displacement of the robotic apparatus; and/or other components.

One approach to object recognition and/or obstacle avoidance may comprise processing of optical flow using a spiking neural network apparatus comprising for example the self-motion cancellation mechanism, such as described, for example, in U.S. patent application Ser. No. 13/689,717 filed on Nov. 30, 2012 and entitled "APPARATUS AND METHODS FOR OBJECT DETECTION VIA OPTICAL FLOW CANCELLATION", the foregoing being incorporated herein by reference in its entirety.

FIG. 10 illustrates a processing apparatus configured to implement object recognition and/or obstacle avoidance and useful with an adaptive controller of a robotic device of FIG. 9. The illustrated processing apparatus 1000 may comprise an input interface configured to receive an input sensory signal 1002. In some implementations, this sensory input may comprise electromagnetic waves (e.g., visible light, IR, UV, and/or other types of electromagnetic waves) entering an imaging sensor array. The imaging sensor array may comprise one or more of retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, grayscale, and/or other representations) and/or frame rates (whether regular or aperiodic) are equally useful with the present disclosure. The apparatus 1000 may be embodied in, for example, an autonomous robotic device, e.g., the device 960 of FIG. 9.

The apparatus 1000 may comprise an encoder 1010 configured to transform (e.g., encode) the input signal 1002 into an encoded signal 1026. In some implementations, the encoded signal may comprise a plurality of pulses (also referred to as a group of pulses) configured to represent to optical flow due to one or more objects in the vicinity of the robotic device.

The encoder 1010 may receive signal 1004 representing motion of the robotic device. In one or more implementations, the input 1004 may comprise an output of an inertial sensor module. The inertial sensor module may comprise one or more acceleration sensors and/or acceleration rate of change (i.e., rate) sensors. In one or more implementations, the inertial sensor module may comprise a 3-axis accelerometer, 3-axis gyroscope, and/or other inertial sensor. It will be appreciated by those skilled in the arts that various other motion sensors may be used to characterized motion of a robotic platform, such as, for example, radial encoders, range sensors, global positioning system (GPS) receivers, RADAR, SONAR, LIDAR, and/or other sensors.

The encoder 1010 may comprise one or more spiking neurons. One or more of the spiking neurons of the module 1010 may be configured to encode motion input 1004. One or more of the spiking neurons of the module 1010 may be configured to encode input 1002 into optical flow, as described in U.S. patent application Ser. No. 13/689,717 filed on Nov. 30, 2012 and entitled "APPARATUS AND METHODS FOR OBJECT DETECTION VIA OPTICAL FLOW CANCELLATION", incorporated supra.

The encoded signal 1026 may be communicated from the encoder 1010 via multiple connections (also referred to as transmission channels, communication channels, or synaptic connections) 1044 to one or more neuronal nodes (also referred to as the detectors) 1042.

In one or more implementations such as those represented by FIG. 10, individual detectors of the same hierarchical layer may be denoted by a "_n" designator, such that, e.g., the designator 1042_1 denotes the first detector of the layer 1042. Although only two detectors (1042_1, 1042_n) are shown in FIG. 10 for clarity, it will be appreciated that the encoder may be coupled to any number of detector nodes that is compatible with the detection apparatus hardware and software limitations. Furthermore, a single detector node may be coupled to any practical number of encoders.

In various implementations, individual detectors 1042_1, 1042_n may contain logic (which may be implemented as a software code, hardware logic, and/or a combination of thereof) configured to recognize a predetermined pattern of pulses in the encoded signal 1026 to produce post-synaptic detection signals transmitted over communication channels 1048. Such recognition may include one or more mechanisms described in one or more of U.S. patent application Ser. No. 12/869,573 filed on Aug. 26, 2010 and entitled "SYSTEMS AND METHODS FOR INVARIANT PULSE LATENCY CODING", now issued as U.S. Pat. No. 8,315,305; U.S. patent application Ser. No. 12/869,583 filed on Aug. 26, 2010 and entitled "INVARIANT PULSE LATENCY CODING SYSTEMS AND METHODS", now issued as U.S. Pat. No. 8,467,623; U.S. patent application Ser. No. 13/117,048 filed on May 26, 2011 and entitled "APPARATUS AND METHODS FOR POLYCHRONOUS ENCODING AND MULTIPLEXING IN NEURONAL PROSTHETIC DEVICES"; and/or U.S. patent application Ser. No. 13/152,084 filed Jun. 2, 2011 and entitled "APPARATUS AND METHODS FOR PULSE-CODE INVARIANT OBJECT RECOGNITION"; each of the foregoing incorporated herein by reference in its entirety. In FIG. 10, the designators 1048_1, 1048_n denote output of the detectors 1042_1, 1042_n, respectively.

In some implementations, the detection signals may be delivered to a next layer of detectors 1052 (comprising detectors 1052_1, 1052_m, 1052_k) for recognition of complex object features and objects, similar to the exemplary implementation described in commonly owned and co-pending U.S. patent application Ser. No. 13/152,084 filed on Jun. 2, 2011 and entitled "APPARATUS AND METHODS FOR PULSE-CODE INVARIANT OBJECT RECOGNITION", incorporated supra. In some implementations, individual subsequent layers of detectors may be configured to receive signals (e.g., via connections 1058) from the previous detector layer, and to detect more complex features and objects (as compared to the features detected by the preceding detector layer). For example, a bank of edge detectors may be followed by a bank of bar detectors, followed by a bank of corner detectors and so on, thereby enabling recognition of one or more letters of an alphabet by the apparatus.

Individual detectors 1042 may output detection (post-synaptic) signals on communication channels 1048_1, 1048_n (with an appropriate latency) that may propagate with appropriate conduction delays to the detectors 1052. In some implementations, the detector cascade shown in FIG. 10 may contain any practical number of detector nodes and detector banks determined, inter alia, by the software/hardware resources of the detection apparatus and complexity of the objects being detected.

The exemplary sensory processing apparatus 1000 illustrated in FIG. 10 may further comprise one or more lateral connections 1046, configured to provide information about activity of neighboring neurons to one another.

In some implementations, the apparatus 1000 may comprise feedback connections 1006, 1056, which may be configured to communicate context information from detectors within one hierarchy layer to previous layers, as illustrated by the feedback connections 1056_1, 1056_2 in FIG. 10. In some implementations, the feedback connection 1006 may be configured to provide feedback to the encoder 1010 thereby facilitating sensory input encoding, as described in detail in commonly owned and co-pending U.S. patent application Ser. No. 13/152,084 filed on Jun. 2, 2011 and entitled "APPARATUS AND METHODS FOR PULSE-CODE INVARIANT OBJECT RECOGNITION", incorporated supra.

Output 1050 of the processing apparatus 1000 may be provided via one or more connections 1058.

Various exemplary computerized apparatus configured to operate a neuron network configured to implement online learning methodology set forth herein are now described in connection with FIGS. 11A-11D.

Figure 11A:
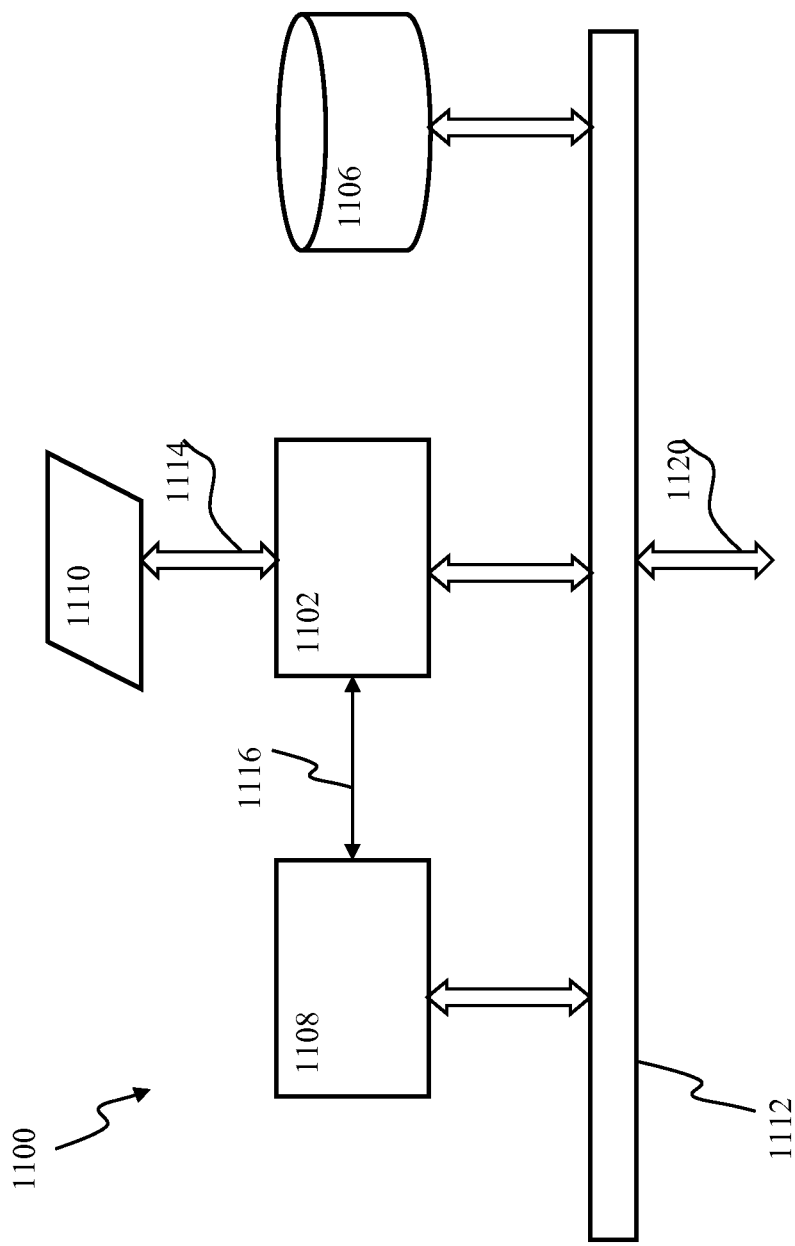
FIG. 11A is a block diagram illustrating a computerized system useful for, inter alia, operating a robotic controller configured using online learning methodology, in accordance with one or more implementations.

A computerized neuromorphic processing system, consistent with one or more implementations, for use with an adaptive robotic controller described, supra, is illustrated in FIG. 11A. The computerized system 1100 of FIG. 11A may comprise an input device 1110, such as, for example, an image sensor and/or digital image interface. The input interface 1110 may be coupled to the processing module (e.g., a single or multi-processor module) via the input communication interface 1114. In some implementations, the interface 1114 may comprise a wireless interface (e.g., cellular wireless, Wi-Fi, Bluetooth, and/or other wireless interface) that enables data transfer to the processor 1102 from remote I/O interface 1100. One such implementation may comprise a central processing apparatus coupled to one or more remote camera devices providing sensory input to the pre-processing module (e.g., described with respect to operation 314 in FIG. 3).

The system 1100 further may comprise a random access memory (RAM) 1108, configured to store neuronal states and connection parameters and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference, supra In some implementations, the memory 1108 may be coupled to the processor 1102 via a direct connection 1116 (e.g., memory bus). The memory 1108 may also be coupled to the processor 1102 via a high-speed processor bus 1112.

The system 1100 may comprise a nonvolatile storage device 1106. The nonvolatile storage device 1106 may comprise, inter alia, computer readable instructions configured to implement various aspects of neuronal network operation. Examples of various aspects of neuronal network operation may include one or more of sensory input encoding, connection plasticity, operation model of neurons, learning rule evaluation, other operations, and/or other aspects. In one or more implementations, the nonvolatile storage 1106 may be used to store state information of the neurons and connections for later use and loading previously stored network configuration. The nonvolatile storage 1106 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processing entities (e.g., computing clusters and/or cloud computing services). Various user input/output interfaces may be similarly applicable to implementations of the disclosure including, for example, an LCD/LED monitor, touch-screen input and display device, speech input device, stylus, light pen, trackball, and/or other devices.

Figure 11B:
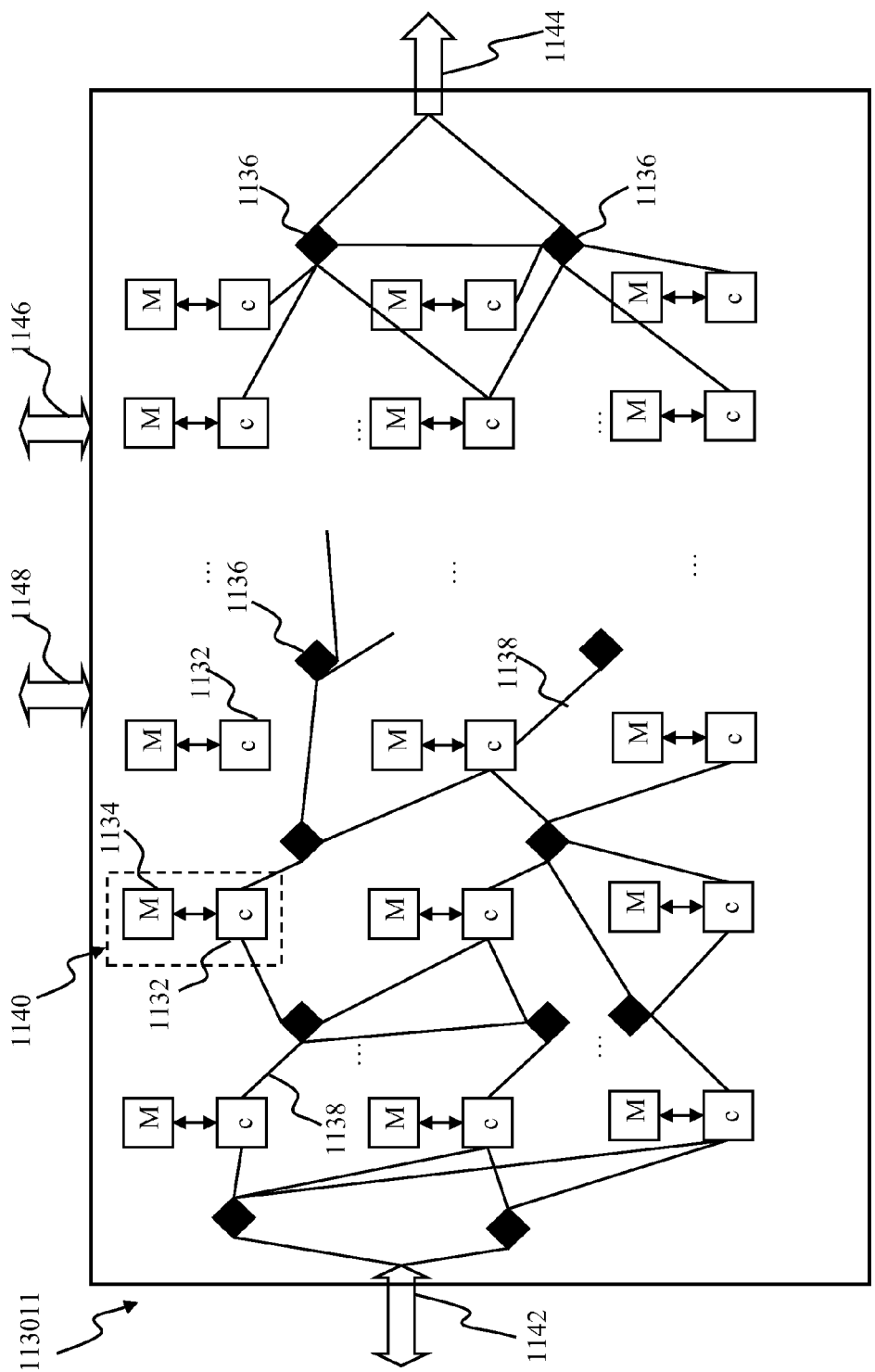
FIG. 11B is a block diagram illustrating a cell-type neuromorphic computerized system useful with, inter alia, online learning methodology of the disclosure, in accordance with one or more implementations.

Referring now to FIG. 11B, one implementation of neuromorphic computerized system configured to implement detection and/or classification mechanisms using a parallel network is described in detail. The neuromorphic processing system 1130 of FIG. 11B may comprise a plurality of processing blocks (micro-blocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, and retargeting, and/or other operations. Network node and connection information for a current task may be saved for future use and flushed. Previously stored network configuration may be loaded in place of the network node and connection information for the current task, as described for example in co-owned U.S. patent application Ser. No. 13/487,576 filed on Jun. 4, 2012 and entitled "DYNAMICALLY RECONFIGURABLE STOCHASTIC LEARNING APPARATUS AND METHODS", now issued as U.S. Pat. No. 9,015,092 which is incorporated herein by reference in its entirety. External memory may include one or more of a Flash drive, a magnetic drive, and/or other external memory.

Figure 11C:
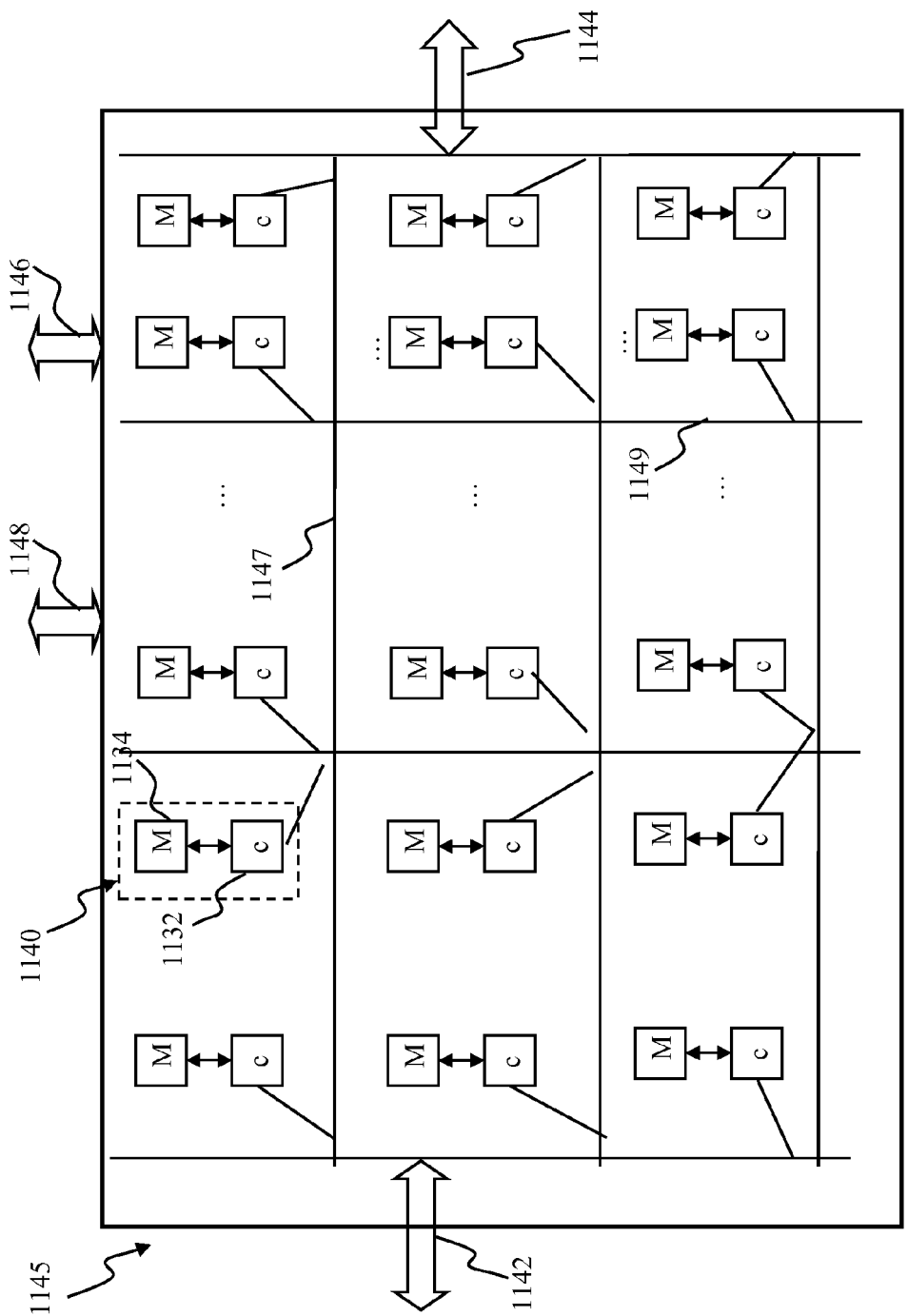
FIG. 11C is a block diagram illustrating a hierarchical neuromorphic computerized system architecture useful with, inter alia, online learning methodology, in accordance with one or more implementations.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

Figure 11D:
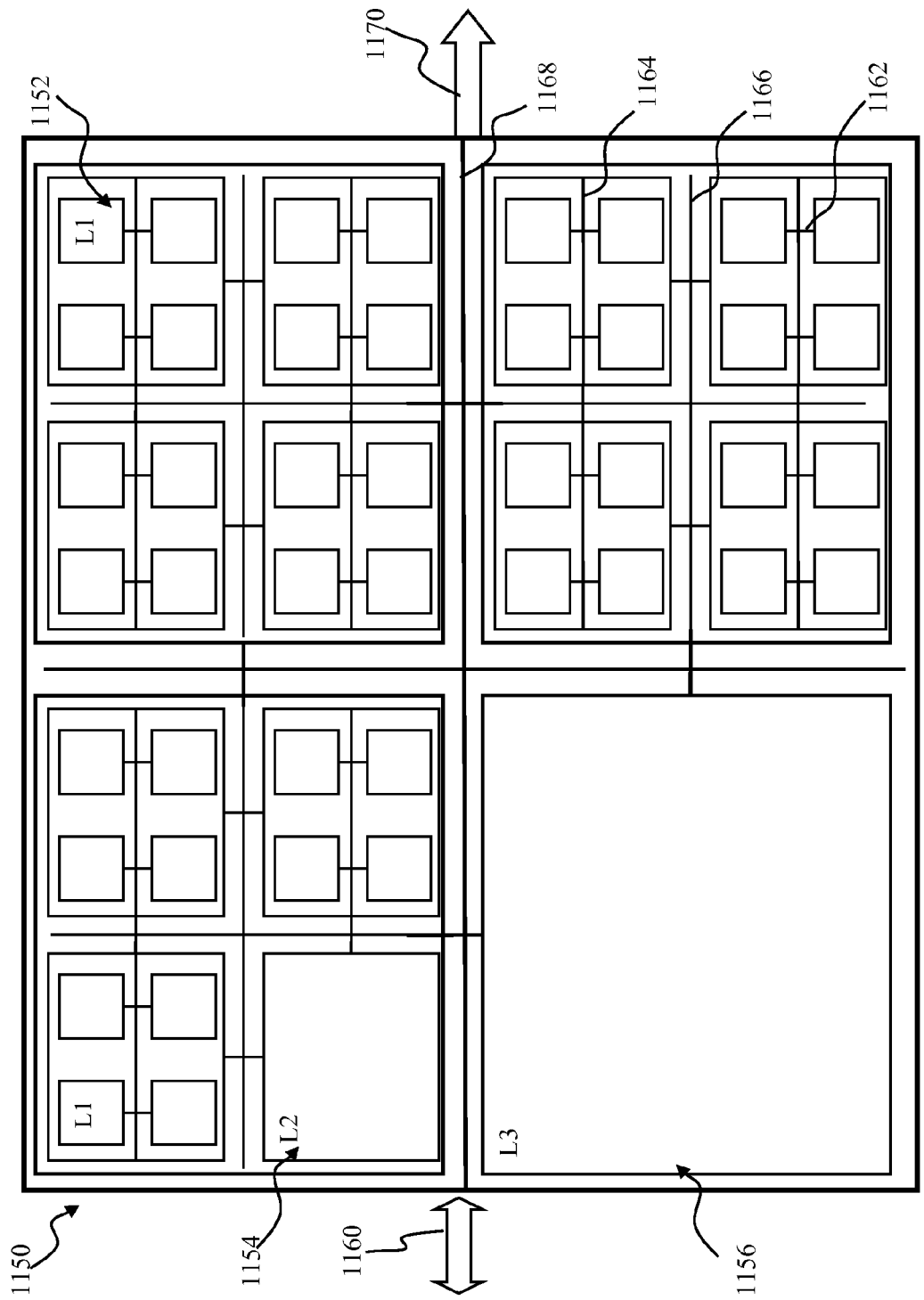
FIG. 11D is a block diagram illustrating cell-type neuromorphic computerized system architecture useful with, inter alia, online learning methodology, in accordance with one or more implementations.

FIG. 11D illustrates one implementation of cell-based neuromorphic computerized system architecture configured to implement online learning using a parallel network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 11B. A number of cell blocks may be arranged in a cluster and may communicate with one another via local interconnects 1162, 1164. Individual clusters may form higher level cell, e.g., cell L2, denoted as 1154 in FIG. 11D. Similarly, several L2 clusters may communicate with one another via a second level interconnect 1166 and form a super-cluster L3, denoted as 1156 in FIG. 11D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, individual L1 cells may process in parallel different portions of the visual input (e.g., encode individual pixel blocks, and/or encode motion signal), with the L2, L3 cells performing progressively higher level functionality (e.g., object detection). Individual ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task, as described for example the application '576, referenced supra.

In one or more implementations, one or more portions of the apparatus 1150 may be configured to operate one or more learning rules, as described for example in the application '576 referenced supra. In one such implementation, one block (e.g., the L3 block 1156) may be used to process input received via the interface 1160 and to provide a teaching signal to another block (e.g., the L2 block 1156) via interval interconnects 1166, 1168.

The methodology for online learning by adaptive controllers set forth herein may advantageously be utilized in various applications, including, e.g., autonomous navigation, classification, detection, object manipulation, tracking, object pursuit, locomotion, and/or other robotic applications.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the disclosure. The scope of the disclosure should be determined with reference to the claims.

What is claimed:

1. A robotic apparatus, comprising:
a controllable actuator;
a sensor module configured to provide information related to an environment surrounding the robotic apparatus; and
an adaptive controller configured to produce a control instruction for the controllable actuator in accordance with the information provided by the sensor module, the control instruction being configured to cause the robotic apparatus to execute a target task;
wherein:
execution of the target task is characterized by the robotic apparatus traversing a trajectory of a first trajectory and a second trajectory;
the first trajectory and the second trajectory each having at least one different parameter associated with the environment;
the adaptive controller is operable in accordance with a supervised learning process configured based on a training signal and a plurality of trials;
at a given trial of the plurality of trials, the control instruction is configured to cause the robot to traverse one of the first trajectory and the second trajectory;
the training signal is generated based on the control instruction;
the training signal is configured to strengthen a trajectory selection by the controller with an effectiveness value such that, based on one of the first and second trajectory being selected for a first trial, the selected one of the first and second trajectory is more likely to be selected during one or more trials subsequent to the first trial; and
the effectiveness value of the training signal on the training process is reduced after a threshold number of trials of the plurality of trials.

2. An adaptive controller apparatus, comprising:
one or more processors configured to execute computer program instructions that, when executed, cause a robot to:
at a first time instance, execute a first action in accordance with a sensory context and a random choice;
at a second time instance subsequent to the first time instance, determine whether to execute the first action based on the sensory context and a teaching input received during the first time instance, the teaching input being received based on the first action in accordance with the sensory context and the random choice; and
execute the first action in accordance with the determination;
wherein:
a target task comprises at least the first action; and
the teaching input is configured to increase or decrease a probability of execution of the first action, the teaching input having an effectiveness value determined from the execution of the first action at one or more time instances, where the effectiveness value is reduced after a threshold number of the one or more time instances.

3. The adaptive controller apparatus of claim 2, further comprising computer program instructions that, when executed, cause the robot to:
at a given time instance, determine whether to execute one of the first action or a second action;
wherein the execution of the first action at the given time instance is configured to increase the probability of execution of the first action at a subsequent time instance.

4. The adaptive controller apparatus of claim 3, wherein the probability of execution of the first action is increased relative to a probability of execution of the second action at the second time instance.

5. The adaptive controller apparatus of claim 3, wherein the teaching input is configured to reduce a probability of the robot executing a composite action at the second time instance, the composite action comprising the first action and the second action.

6. The adaptive controller apparatus of claim 2, further comprising a computer-readable medium comprising a plurality of instructions that, when executed, cause the robot to:
receive a first control signal and a second control signal via a supervised learning process;
wherein the first action execution at the first time instance and the second time instance is based on the first control signal and the second control signal, respectively, received by the supervised learning process; and
responsive to the receipt of the teaching input, associate a sensory context to the first action.

7. The adaptive controller apparatus of claim 6, wherein:
the supervised learning process is configured based on a neuron network comprising a plurality of neurons communicating via a plurality of connections;
one or more individual connections of the plurality of connections provide an input into a given one of the plurality of neurons that is characterized by a connection efficacy configured to affect operation of the given one of the plurality of neurons; and
the association of the sensory context to the first action comprises an adjustment of the connection efficacy based on the teaching input and the first control signal.

8. The adaptive controller apparatus of claim 2, wherein:
the first action and a second action are characterized by a different value of a state parameter associated with an environment; and
the state parameter is selected from a group consisting of a spatial coordinate, a robot's velocity, a robot's orientation, and a robot's position.

9. The adaptive controller apparatus of claim 2, wherein:
the adaptive controller apparatus is embodied in the robot; and
responsive to the sensory context comprising a representation of an obstacle, the target task comprises an avoidance maneuver executed by the robot; and
responsive to the sensory context comprising a representation of a target, the target task comprises an approach maneuver executed by the robot.

10. The adaptive controller apparatus of claim 2, wherein:
the execution of the first action is configured based on a control signal, the control signal being updated at time intervals shorter than one second; and
the first time instance and the second time instance are separated by an interval that is no shorter than one second.

11. The adaptive controller apparatus of claim 2, wherein the teaching input is provided by a computerized entity via a wireless interface.

12. The adaptive controller apparatus of claim 2, wherein:
the robot comprises an autonomous platform;
the controller apparatus is embodied on the autonomous platform; and the teaching input is provided by a computerized module comprising a proximity indicator configured to generate a proximity indicator signal based on an object being within a given range from the platform.

13. The adaptive controller apparatus of claim 2, wherein:
the adaptive controller apparatus is operable in accordance with a supervised learning process configured based on the teaching signal;
the sensory context comprises information indicative of an object within an environment of the robot;
the execution of the first action is based on a first predicted control output of the supervised learning process configured in accordance with the sensory context; and
execution of a second action is based on a second predicted control output of the supervised learning process configured in accordance with the sensory context and the teaching input.

14. The adaptive controller apparatus of claim 13, wherein:
the first and the second predicted control output are determined based on an output of an adaptive predictor module operable in accordance with the supervised learning process configured in accordance with the teaching input;
the supervised learning process is configured to combine the teaching signal with the first predicted control output at the first time instance to produce a combined signal; and
the teaching input at the second time instance is configured based on the combined signal.

15. The adaptive controller apparatus of claim 14, wherein:
the supervised learning process is configured based on a backward propagation of an error; and
the combined signal is determined based on a transform function configured based on a union operation.

16. The adaptive controller apparatus of claim 14, wherein:
the combined signal is determined based on a transform function configured based on one or more operations including an additive operation characterized by a first weight and a second weight;
the first weight is configured to be applied to a predictor output; and
the second weight is configured to be applied to the teaching input.

17. The adaptive controller apparatus of claim 16, wherein:
a value of the first weight at the first time instance is greater than the value of the first weight at the second time instance; and
a value of the second weight at the first time instance is lower than the value of the second weight at the second time instance.

18. The adaptive controller apparatus of claim 2, wherein:
the robot comprises a mobile platform;
the adaptive controller apparatus is configured to be embodied on the mobile platform; and
the sensory context is based on a visual input provided by a camera disposed on the mobile platform.

19. A method of increasing a probability of action execution by a robotic apparatus, comprising:
receiving a sensory context from a sensor;
at a first time instance, executing a first action with the robotic apparatus in accordance with the sensory context;
at a second time instance subsequent to the first time instance, determining with an adaptive controller whether to execute the first action based on the sensory context received from the sensor and a teaching input received from a user interface during the first time instance; and
executing the first action with the robotic apparatus in accordance with the determination of the adaptive controller;
wherein:
a target task comprises at least the first action; and
increasing or decreasing a probability of execution of the first action is based on the teaching input, the teaching input having an effectiveness value determined by the adaptive controller from the execution of the first action at one or more time instances, where the effectiveness value is reduced after a threshold number of the one or more time instances.

20. The method of claim 19, wherein the determining whether to execute the first action further comprises determining whether to execute a second action by the adaptive controller; and the method further comprises executing the second action with the robotic apparatus in accordance with the determination of whether to execute the second action.

* * * * *